(12) United States Patent
Fukushima et al.

(10) Patent No.: US 8,184,109 B2
(45) Date of Patent: May 22, 2012

(54) COORDINATE INPUT DEVICE, POSITION INDICATOR AND VARIABLE CAPACITOR

(75) Inventors: Yasuyuki Fukushima, Kitakatsushika-gun (JP); Hiroyuki Fujitsuka, Kitakatsushika-gun (JP)

(73) Assignee: Wacom Co., Ltd., Kitasaitama-gun (JP)

( * ) Notice: Subject to any disclaimer, the term of this patent is extended or adjusted under 35 U.S.C. 154(b) by 880 days.

(21) Appl. No.: 12/258,164

(22) Filed: Oct. 24, 2008

(65) Prior Publication Data
US 2009/0114459 A1   May 7, 2009

(30) Foreign Application Priority Data

Oct. 24, 2007 (JP) .................. 2007-276930
Nov. 22, 2007 (JP) .................. 2007-303620

(51) Int. Cl.
*G06F 3/033* (2006.01)
(52) U.S. Cl. .................... 345/179; 178/19.03
(58) Field of Classification Search ............. 345/179; 178/18, 19.03, 19.04; 73/514.32; 327/111
See application file for complete search history.

(56) References Cited

U.S. PATENT DOCUMENTS

| | | | |
|---|---|---|---|
| 5,206,785 A | | 4/1993 | Hukashima |
| 5,581,052 A | * | 12/1996 | Padula et al. ............. 178/19.04 |
| 6,252,182 B1 | * | 6/2001 | Lai ............................ 178/19.04 |
| 6,853,369 B2 | | 2/2005 | Fukushima |
| 6,960,945 B1 | * | 11/2005 | Bonin ........................... 327/111 |
| 2001/0047689 A1 | * | 12/2001 | McIntosh ................... 73/514.32 |
| 2007/0180923 A1 | | 8/2007 | Liu |
| 2008/0250864 A1 | | 10/2008 | Shipton |

FOREIGN PATENT DOCUMENTS

| | | |
|---|---|---|
| JP | 4096212 A | 3/1992 |
| JP | 2001319831 A | 11/2001 |
| JP | 2005019583 A | 1/2005 |

* cited by examiner

*Primary Examiner* — Quan-Zhen Wang
*Assistant Examiner* — Yuk Chow
(74) *Attorney, Agent, or Firm* — Seed IP Law Group PLLC

(57) ABSTRACT

A dielectric (16) is housed in a chassis (15) having an opening (22) and a main face portion (23). The dielectric (16) is formed with a hole (30) extending from a first surface (28) to a second surface (29) thereof, and the main face portion (23) of the chassis (15) is formed with a through-hole (25). A conductive pin (17) is inserted into the hole (30) and the through-hole (25) with one end portion thereof projected to the outside of the chassis (15) from the main face portion (23). Further, the electrode portion (32) of the lead electrode (18) is interposed between the second surface (29) of the dielectric (16) and the main face portion (23) of the chassis (15), and a terminal piece (33) of the lead electrode (18) is projected toward the outside from the main face portion (23) of the chassis (15). Further, a conductive elastic member (19) is arranged to approach the first surface (28) of the dielectric (16). Further, a biasing member (21) is provided for biasing the electrode portion (32) of the lead electrode (18) or the dielectric (16), so that the second surface (29) of the dielectric (16) and the electrode portion (32) of the lead electrode (18) are brought into contact with each other. With such a configuration, the dielectric and the electrode can be reliably brought into contact with each other, and good pen pressure characteristics can be obtained.

18 Claims, 25 Drawing Sheets

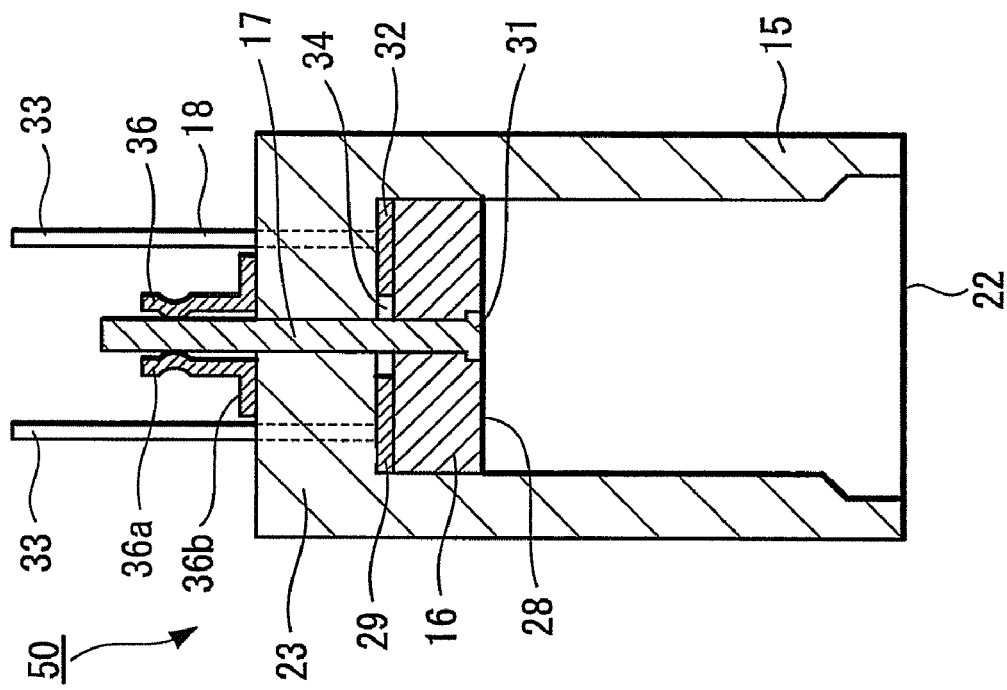
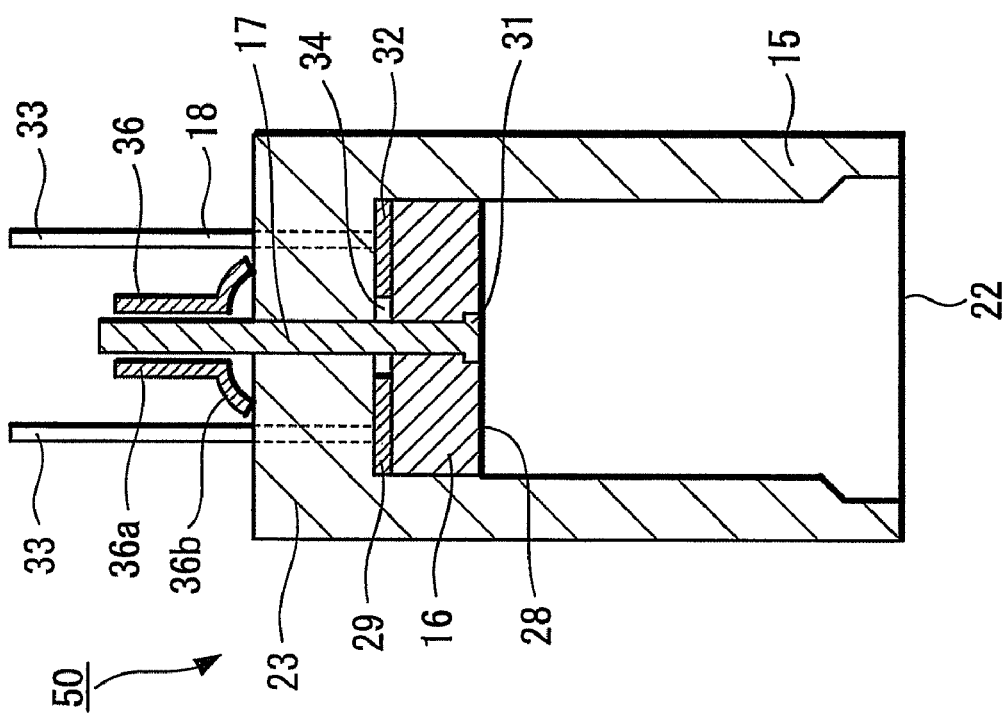
*Fig. 7A.*
*Fig. 7B.*

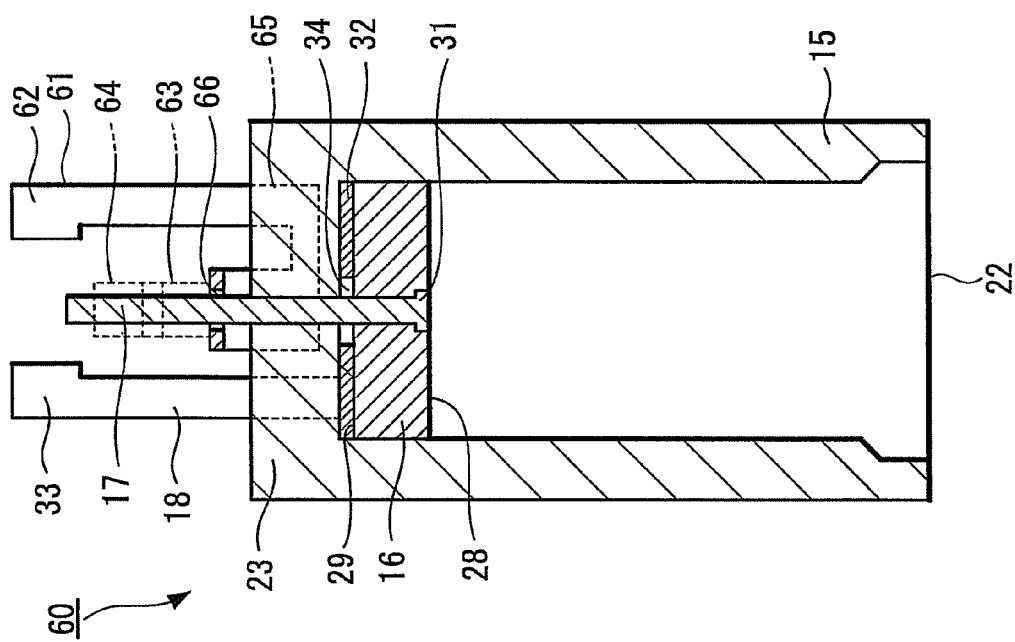
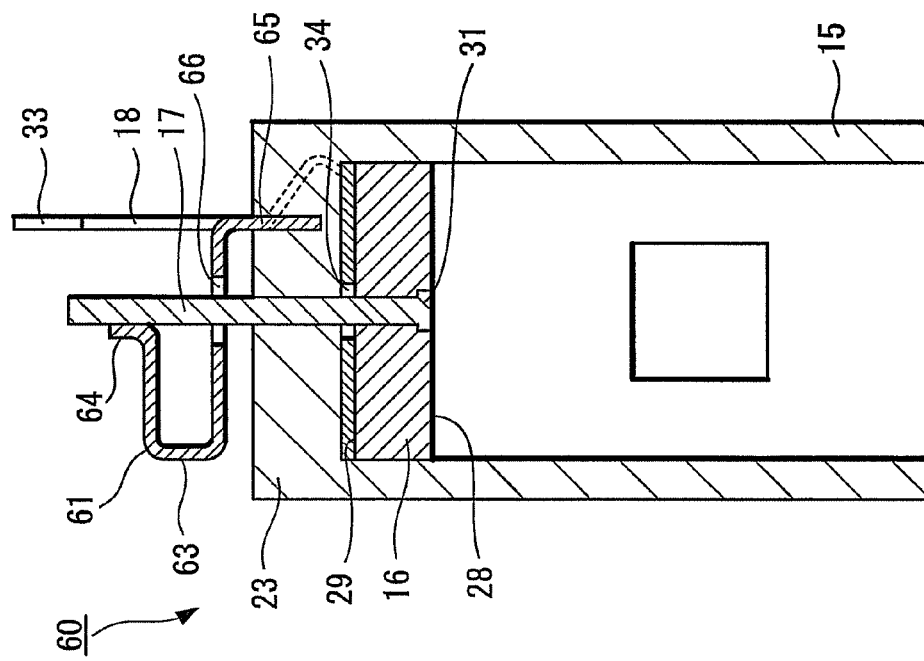

COORDINATE INPUT DEVICE, POSITION INDICATOR AND VARIABLE CAPACITOR

The present application claims priority under 35 U.S.C. §119 from Japanese Patent Application JP 2007-276930 filed in the Japanese Patent Office on Oct. 24, 2007 and Japanese Patent Application JP 2007-303620 filed in the Japanese Patent Office on Nov. 22, 2007, the entire contents of which being incorporated herein by reference.

BACKGROUND OF THE INVENTION

1. Field of the Invention

The present invention relates to a position indicator, such as a stylus pen, a coordinate input device equipped with the position indicator, and a variable capacitor used as a pen pressure detecting section in the position indicator.

2. Description of the Related Art

In recent years, a coordinate input device has been used as an input device of, for example, a personal computer. Such a coordinate input device includes a pen-like position indicator and a position detecting device having an input surface, on which input operation such as pointing operation, handwritten character input operation or hand-drawn illustration input operation is performed using the position indicator.

A variable capacitor such as disclosed in Japanese Unexamined Patent Application Publication No. H04-96212 generally corresponding to U.S. Pat. No. 5,206,785, incorporated by reference herein, is used as a pen pressure detecting section of the position indicator. The variable capacitor includes a first electrode attached on one surface of a dielectric, and a second electrode. The second electrode is a flexible member arranged facing the other surface of the dielectric. The variable capacitor is provided with a member for spacing the second electrode and the other surface of the dielectric from each other, except for certain portions thereof, by a very small distance, and a member for applying a pressure to the second electrode towards the dielectric.

FIGS. 34A and 34B show a concrete configuration of a variable capacitor 200 disclosed in Japanese Unexamined Patent Application Publication No. H04-96212. The variable capacitor 200 includes a substantially disc-like dielectric 201, a first electrode 202 attached on one surface 201a of the dielectric 201, and a second electrode 203 arranged on the side of the other surface 201b of the dielectric 201. The second electrode 203 is a flexible member disposed on the side of the other surface 201b of the dielectric 201 via a ring-shaped spacer 204. Further, a rod 210 is disposed on the side of the second electrode 203 opposite to the dielectric 201 via an elastic body 205.

A first terminal 206 is disposed on the side of one surface of the first electrode 202. The first terminal 206 includes a disc-like flange portion 206a and a lead portion 206b. The lead portion 206b extends from substantially the center of one surface of the flange portion 206a in the direction opposite to the dielectric 201. When a pen pressure is applied, the flange portion 206a contacts the one surface of the first electrode 202 so as to be electrically connected to the first electrode 202.

A second terminal 207 is arranged on an end (or edge) portion of the second electrode 203. Similar to the first terminal 206, the second terminal 207 is configured by a disc-like flange portion 207a and a lead portion 207b. The lead portion 207b extends from substantially the center of one surface of the flange portion 207a along the side of the dielectric 201. When a pen pressure is applied, the flange portion 207a contacts an end (or edge) portion of one surface of the second electrode 203 so as to be electrically connected to the second electrode 203.

The spacer 204 is interposed between the other surface 201b of the dielectric 201 and the second electrode 203. In a state where no pressure is applied to the rod 210 (i.e., when the variable capacitor is in an initial state), a very small space is formed between the other surface 201b and the second electrode 203 of the variable capacitor 200. When a pressure is applied to the rod 210, as shown in FIG. 34B, the second electrode 203 will contact the other surface 201b of the dielectric 201. When a further higher pressure is applied to the rod 210, the contact area between the second electrode 203 and the other surface 201b of the dielectric 201 will increase, and therefore the capacitance value between the first terminal 206 and the second terminal 207 will increase. The pressure (i.e., pen pressure) applied to the rod 210 is detected by detecting the variation of the capacitance value between the first terminal 206 and the second terminal 207.

SUMMARY OF THE INVENTION

However, as shown in FIGS. 34A and 34B, the variable capacitor disclosed in Japanese Unexamined Patent Application Publication No. H04-96212 has to be provided with a flexible second electrode 203 and a ring-shaped spacer 204 for spacing the second electrode 203 and the dielectric 201 from each other, except for portions thereof, by a very small distance. Due to such a configuration, more components are needed, and the complexity of assembling process of the variable capacitor is increased. Further, if the dielectric 201 is inclined or tilted, either during assembling process or in use, since the first electrode 202 or the second electrode 203 would then not reliably contact the one surface of the dielectric 201 or the other surface of the dielectric 201, the pen pressure characteristics of the position indicator 1 will be adversely affected.

Further, in the variable capacitor disclosed in Japanese Unexamined Patent Application Publication No. H04-96212, a very small space is provided between the second electrode 203 and the other surface 201b of the dielectric 201. The pressure applied to the rod 210 is detected in a state where the second electrode and the other surface of the dielectric contact each other. If the pressure applied to the rod is very small, since the second electrode and the dielectric do not contact each other, the pressure applied to the rod can not be detected. Since a very small pen pressure can not be detected, as a result, finely drawn character or illustration can not be vividly displayed.

In view of the aforesaid problems, an object of the present invention is to provide a position indicator, a position detecting device, and a variable capacitor, in which the configuration of the variable capacitor is simplified, and the dielectric and the electrodes of the variable capacitor can be reliably brought into contact with each other.

Another object of the present invention is to provide a position indicator, a position detecting device, and a variable capacitor having improved pressure detection sensitivity and being capable of detecting a very small pressure (i.e., a very small pen pressure).

A coordinate input device according to an aspect of the present invention includes: a position detecting device having an input surface; and a position indicator for indicating its own position relative to the input surface, wherein the position indicator includes: a housing; a rod housed in the housing and having a pen-tip projected to the outside of the housing; and a variable capacitor for detecting a pressing force applied to the pen-tip. The variable capacitor includes: a chassis having an opening opened on one face thereof and a main face portion located opposite the opening, the main face portion having a through-hole formed therein; a dielectric housed in the chassis and having a hole extending from a first surface to a second surface thereof, the second surface being opposite the first surface; a first terminal inserted into the hole formed in the dielectric and the through-hole formed in the main face portion, one end of the first terminal being exposed to the outside of the chassis from the main face portion and the other end of the first terminal having a pin head portion abutting the first surface of the dielectric; a second terminal having a first electrode portion interposed between the second surface of the dielectric and the main face portion of the chassis and a terminal portion exposed to the outside of the chassis from the main face portion, the first electrode portion forming one electrode of the variable capacitor; a conductive elastic member disposed so as to be able to contact the first surface of the dielectric, the conductive elastic member serving as a second electrode by being pressed toward the first surface of the dielectric by the pressing force applied to the pen-tip, the second electrode forming the other electrode of the variable capacitor; and a biasing member for bringing the second surface of the dielectric into contact with the first electrode portion.

A position indicator according to another aspect of the present invention includes: a housing; a rod housed in the housing and having a pen-tip projected to the outside of the housing; and a variable capacitor for detecting a pressing force applied to the pen-tip. The variable capacitor includes: a chassis having an opening opened on one face thereof and a main face portion located opposite the opening, the main face portion having a through-hole formed therein; a dielectric housed in the chassis and having a hole extending from a first surface to a second surface thereof, the second surface being opposite the first surface; a first terminal inserted into the hole formed in the dielectric and the through-hole formed in the main face portion, one end of the first terminal being exposed to the outside of the chassis from the main face portion and the other end of the first terminal having a pin head portion abutting the first surface of the dielectric; a second terminal having a first electrode portion interposed between the second surface of the dielectric and the main face portion of the chassis and a terminal portion exposed to the outside of the chassis from the main face portion; a conductive elastic member disposed so as to be able to contact the first surface of the dielectric, the conductive elastic member serving as a second electrode by being pressed toward the first surface of the dielectric by the pressing force applied to the pen-tip; and a biasing member for bringing the second surface of the dielectric into contact with the first electrode portion.

A variable capacitor according to yet another aspect of the present invention includes: a chassis having an opening opened on one face thereof and a main face portion located opposite the opening, the main face portion having a through-hole formed therein; a dielectric housed in the chassis and having a hole extending from a first surface to a second surface thereof, the second surface being opposite the first surface; a first terminal inserted into the hole formed in the dielectric and the through-hole formed in the main face portion, one end of the first terminal being exposed to the outside of the chassis from the main face portion and the other end of the first terminal having a pin head portion abutting the first surface of the dielectric; a second terminal having a first electrode portion interposed between the second surface of the dielectric and the main face portion of the chassis and a terminal portion exposed to the outside of the chassis from the main face portion; a conductive elastic member disposed so as to be able to contact the first surface of the dielectric, the conductive elastic member serving as a second electrode by being pressed toward the first surface of the dielectric by a pressing force applied from the external; and a biasing member for bringing the second surface of the dielectric into contact with the first electrode portion.

With the coordinate input device, the position indicator, and the variable capacitor according to the present invention, not only the configuration of the variable capacitor serving as the pen pressure detecting section can be simplified, but also the dielectric and the electrodes of the variable capacitor can be reliably brought into contact due to the provision of the biasing member, and therefore good pen pressure characteristics can be obtained.

Further, with the coordinate input device, the position indicator, and the variable capacitor according to the present invention, a very small pressure (i.e., a very small pen pressure) can be detected, and the pressure detection sensitivity can be improved.

BRIEF DESCRIPTION OF THE DRAWINGS

FIG. 4A is a front view, FIG. 4B is a cross section taken along line A-A of FIG. 4A, and FIG. 4C is a cross section taken along line B-B of FIG. 4A;

FIG. 5A is a front view, FIG. 5B is a cross section taken along line A-A of FIG. 5A, and FIG. 5C is a cross section taken along line B-B of FIG. 5A;

FIGS. 7A and 7B show the second embodiment of the variable capacitor according to the present invention, where FIG. 7A is a cross section showing the second embodiment of the variable capacitor in a state in which a conductive pin thereof has not been fixed to a joining portion thereof, and FIG. 7B is a cross section showing the second embodiment of the variable capacitor in a state in which the conductive pin thereof has been fixed to the joining portion thereof;

FIGS. 10A and 10B are cross sections showing the third embodiment of the variable capacitor according to the present invention;

FIGS. 34A and 34B schematically show a variable capacitor according to a related art, in which FIG. 34A shows the variable capacitor in an initial state, and FIG. 34B shows the variable capacitor in a state where a pressure (a pen pressure) is applied to a rod of the position indicator.

DETAILED DESCRIPTION OF THE PREFERRED EMBODIMENT(S)

Figure 1:
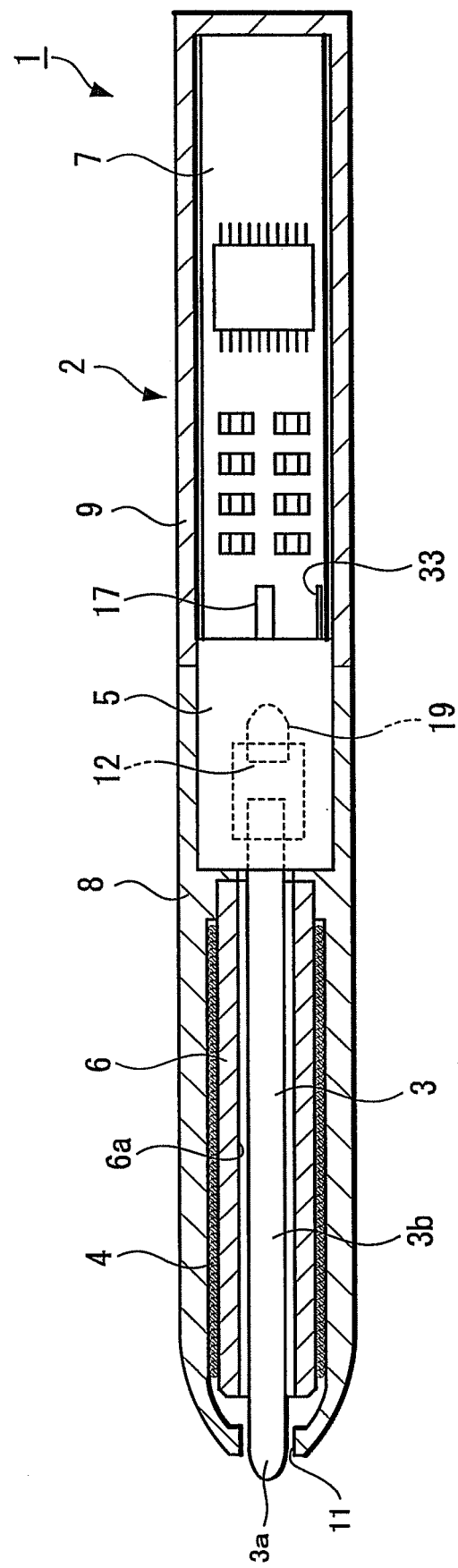
FIG. 1 is a cross section showing a position indicator according to an embodiment of the present invention.

Embodiments of a position indicator, a coordinate input device, and a variable capacitor according to the present invention will be described below.

A first embodiment of the present invention will be described below with reference to FIGS. 1 to 5C.

A position indicator 1 includes a housing 2 forming an exterior portion, a rod 3 having a pen-tip 3a, a resonant coil 4, a variable capacitor 5, a ferrite core 6, and a printed circuit board 7 on which electronic components are mounted.

The housing 2 includes a first housing 8 and a second housing 9. The housing 2 is formed in a bottomed tubular shape with one end thereof closed. The housing 2 is assembled by coupling the first housing 8 and the second housing 9 with each other in an axial direction.

One end in the axial direction of the first housing 8 is substantially cone-shaped. An opening 11 is formed in the tip portion of the substantially cone-shaped one end of the first housing 8. The other end in the axial direction of the first housing 8 is opened.

The second housing 9 is formed in a tubular shape with one end thereof in the axial direction opened and the other end in the axial direction closed. The first housing 8 and the second housing 9 are coaxially coupled and fixed with each other by a fixing means such as an adhesive, a fixing screw or the like. The printed circuit board 7 is fixed to the second housing 9 by a fixing means such as an adhesive, a fixing screw or the like. The ferrite core 6 is housed in the first housing 8.

The ferrite core 6 is a tubular member. The rod 3 is passed through a through-hole 6a of the ferrite core 6. The pen-tip 3a of the rod 3 is projected to the outside from one end in the axial direction of the ferrite core 6. The resonant coil 4 is wound around the periphery of the ferrite core 6. Both ends (not shown) of the resonant coil 4 are electrically connected to the electronic components through the printed circuit board 7.

The rod 3 is a bar-like member. The rod 3 includes the pen-tip 3a serving as an indicating portion, and a shaft portion 3b formed continuously from the pen-tip 3a. The rod 3 is housed in the housing 2 along the axial direction of the housing 2. The pen-tip 3a is substantially cone-shaped. When the rod 3 is housed in the housing 2, the pen-tip 3a is projected to the outside from the opening 11 of the first housing 8.

A rod holder 12 is attached to the other end of the shaft portion 3b.

The details of the variable capacitor according to the present invention will be described below with reference to FIG. 2. The capacitance value of the variable capacitor 5 varies in response to a pressure applied thereto. The variable capacitor 5 includes a sleeve 15 serving as a chassis, a dielectric 16, a conductive pin 17 serving as a first terminal, a lead electrode 18 configured by a first electrode portion 32 and a terminal portion (including terminal pieces 33), a conductive elastic member 19 forming a second electrode portion, and a biasing member 21.

The rod holder 12 is a substantially tubular member. Two engaging portions 12a, 12a (only one is shown) each having a substantially triangle-shaped cross-section are arranged on the periphery of the rod holder 12. The rod holder 12 is formed with a slit 12b which extends over a predetermined length from one end in the axial direction of the rod holder 12. The shaft portion 3b of the rod 3 is inserted into a through-hole of the rod holder 12 from the side of the slit 12b.

The sleeve 15 is a substantially tubular hollow member. The side face of the sleeve 15 is provided with two plane portions 26a in parallel with each other (only one is shown).

The sleeve 15 has, on one end in the axial direction thereof, an opening 22. The sleeve 15 has, on the other end in the axial direction thereof, a main face portion 23. The main face portion 23 is opposite to the opening 22. The main face portion 23 is formed with two square holes 24, 24 and a through-hole 25. Two terminal pieces 33, 33 serving as a terminal portion of the lead electrode 18 are respectively passed through the two square holes 24, 24. The through-hole 25 is formed substantially at the center of the main face portion 23. One end portion of the conductive pin 17 is passed through the through-hole 25. Two grooves 26, 26 are respectively formed in the main face portion 23 at two edges where the main face portion 23 and the two plane portions 26a meet each other. Two engaged portions 27, 27 are formed in the side face of the sleeve 15 (only one is shown). The two engaged portions 27, 27 are respectively engaged with the two engaging portions 12a, 12a of the rod holder 12. The sleeve 15 may be formed of, for example, an engineering plastic.

Dielectric 16 is formed in a substantially rectangular parallelepiped-shape with chamfered corners. The dielectric 16 has a first surface 28 formed in substantially quadrangular shape, and a second surface 29 opposite to the first surface 28. The dielectric 16 is formed with a hole 30 penetrating the dielectric 16 from the first surface 28 to the second surface 29. The first surface 28 is formed with, along the edge of the hole 30, a recessed portion 10 whose diameter is larger than that of the hole 30. (See FIG. 4B.) As shown in FIGS. 4A to 5C, the dielectric 16 is housed in the sleeve 15 in a state where the second surface 29 thereof faces the side of the main face portion 23 of the sleeve 15.

The conductive pin 17 is formed in a thin rod/bar-like shape. The conductive pin 17 electrically connects both ends of the dielectric 16 with each other. The conductive pin 17 has, on the other end in the axial direction thereof, a disc-like pin head portion 31. When the conductive pin 17 is inserted into the hole 30 of the dielectric 16, the pin head portion 31 is inserted into the recessed portion 10 formed in the first surface 28. The one end of the conductive pin 17 is connected to a contact point (not shown) of the printed circuit board 7 by means of, for example, resistance welding, ultrasonic welding or the like, and thereby the conductive pin 17 is electrically connected to the electronic components mounted on the printed circuit board 7.

The lead electrode 18 is a component for electrically connecting the electronic component of the printed circuit board 7 with the variable capacitor. The lead electrode 18 includes a flat plate shaped electrode portion 32 and the two terminal pieces 33, 33. The electrode portion 32 constitutes the first electrode portion, and the terminal pieces 33, 33 constitute the terminal portion. The size of the electrode portion 32 is substantially equal to that of the second surface 29 of the dielectric 16. Further, the electrode portion 32 is formed with, at substantially the center thereof, an opening hole 34 through which the conductive pin 17 is passed. The two terminal pieces 33, 33 are formed continuously from two opposite sides of the electrode portion 32 and are substantially orthogonal to the electrode portion 32. The material of the lead electrode 18 is, for example, a silver-plated titanium copper.

The lead electrode 18 is housed in the sleeve 15. At this time, the two terminal pieces 33, 33 of the lead electrode are respectively passed through the two square holes 24, 24 formed in the main face portion 23 of the sleeve 15. The two terminal pieces 33, 33 are connected to a contact point (not shown) of the printed circuit board 7 by means of, for example, resistance welding, ultrasonic welding or the like, and thereby the lead electrode 18 is electrically connected to the electronic components of the printed circuit board 7.

One end portion of the conductive elastic member 19 is formed in a dome shape and the other end portion of the conductive elastic member 19 is formed in a cylindrical shape. The cylindrical portion of the conductive elastic member 19 is housed in the through-hole of the rod holder 12. In this manner, the conductive elastic member 19 is attached to the other end portion in the axial direction of the rod 3 through the rod holder 12.

The biasing member 21 includes an eyelet 36 as a joining portion, and a spring member 37. The eyelet 36 has a tubular portion 36a and a flange portion 36b. The one end portion of the conductive pin 17 is inserted into a through-hole of the eyelet 36. In a state where the conductive pin 17 is inserted into the eyelet 36, the side face of the tubular portion 36a of the eyelet 36 is crushed so that the eyelet 36 is caulked, and is fixed to the conductive pin 17. The flange portion 36b is arranged at one end in the axial direction of the biasing member 21.

The spring member 37 is substantially formed in U-shape, for example. The spring member 37 includes a plane portion 37a, a first leg portion 37b and a second leg portion 37c. The plane portion 37a is substantially formed in a rectangle shape. The first leg portion 37b is formed continuously from one end in the axial direction of the plane portion 37a and is substantially orthogonal to the plane portion 37a. The plane portion 37a is formed with, at substantially the center thereof, an opening hole 38 through which the conductive pin 17 is passed. The second leg portion 37c is formed continuously from the other end in the axial direction of the plane portion 37a and is substantially orthogonal to the plane portion 37a. The two leg portions 37b, 37c face each other. The two leg portions 37b, 37c are respectively passed through the grooves 26, 26 formed in the main face portion 23 of the sleeve 15. The spring member 37 is made of an elastic material such as a metal like titanium copper or stainless steel.

Note that, although the first embodiment is described using an example in which a spring member substantially formed in U-shape is used as the spring member 37, the present invention is not limited to that example. For example, the spring member may be a coil spring or other elastic member.

The variable capacitor 5 having the aforesaid configuration is assembled by, for example, the steps described below with reference to FIGS. 2 to 5C.

Figure 2:
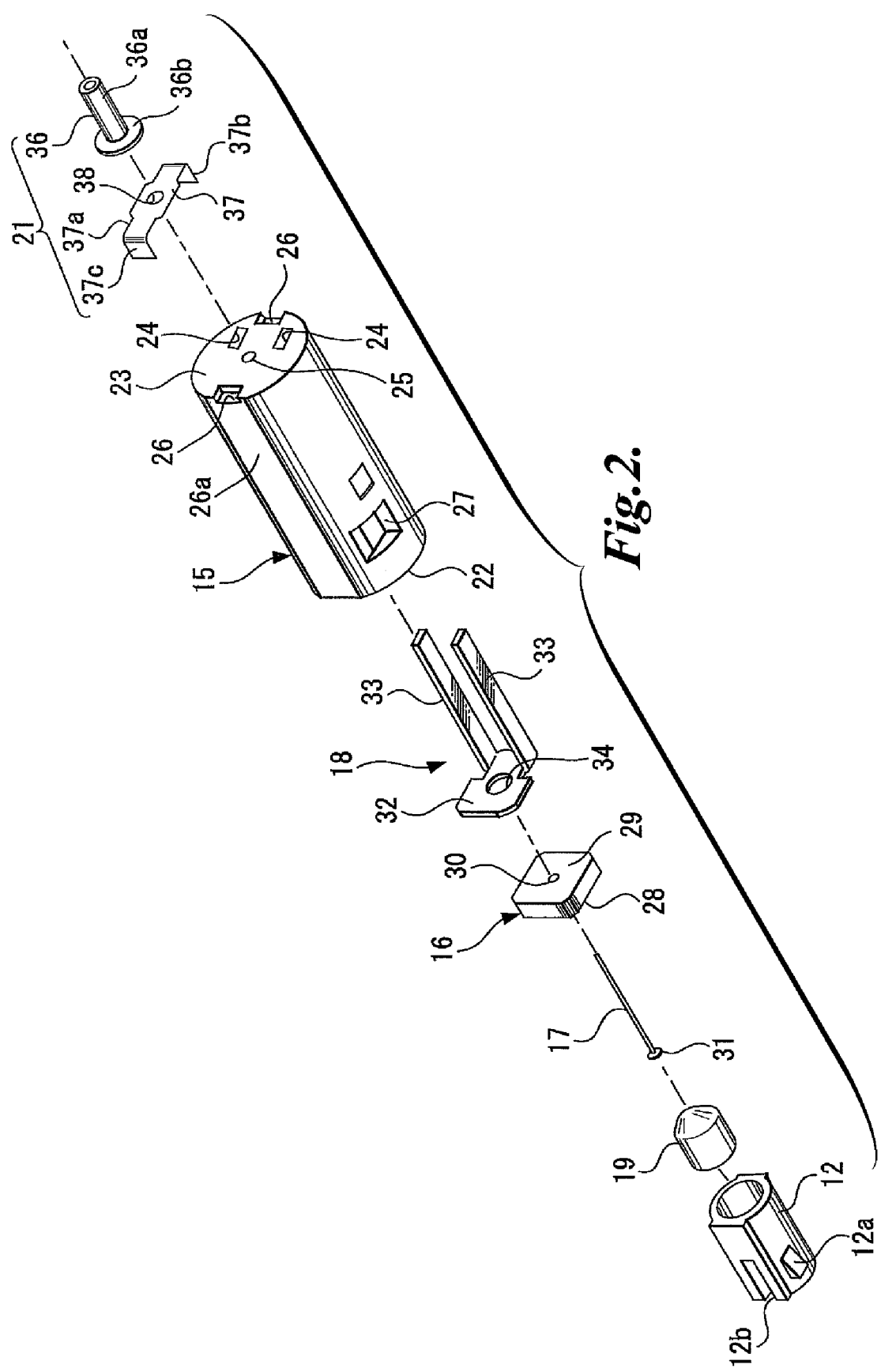
FIG. 2 is an exploded perspective view showing a first embodiment of a variable capacitor according to the present invention.

First, as shown in FIG. 2, the two terminal pieces 33, 33 of the lead electrode 18 are respectively inserted through the two square holes 24, 24 of the main face portion 23 of the sleeve 15 so that the lead electrode 18 is housed in the sleeve 15. Next, the dielectric 16 is housed in the sleeve 15 so that the second surface 29 of the dielectric 16 faces the electrode portion 32 of the lead electrode 18, and thereby the electrode portion 32 of the lead electrode 18 is interposed between the dielectric 16 and the main face portion 23 of the sleeve 15.

Figure 4A:
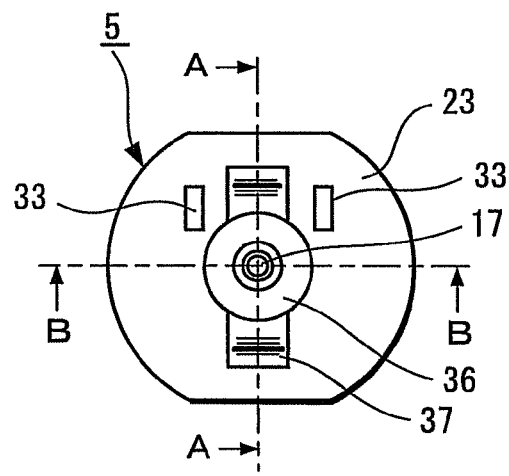
FIG. 4A to 4C show the first embodiment of the variable capacitor in a state before a conductive pin thereof is fixed to a joining portion thereof, where
Figure 4B:
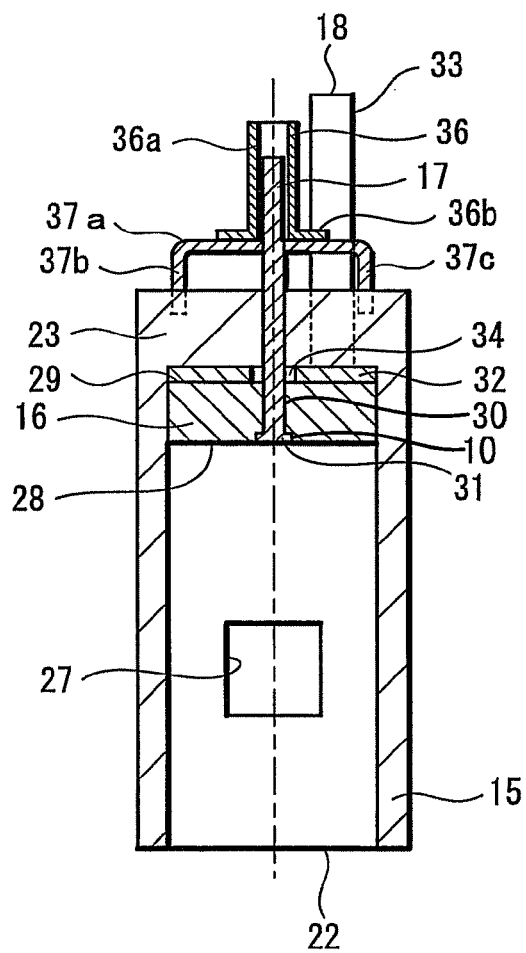
Figure 4C:
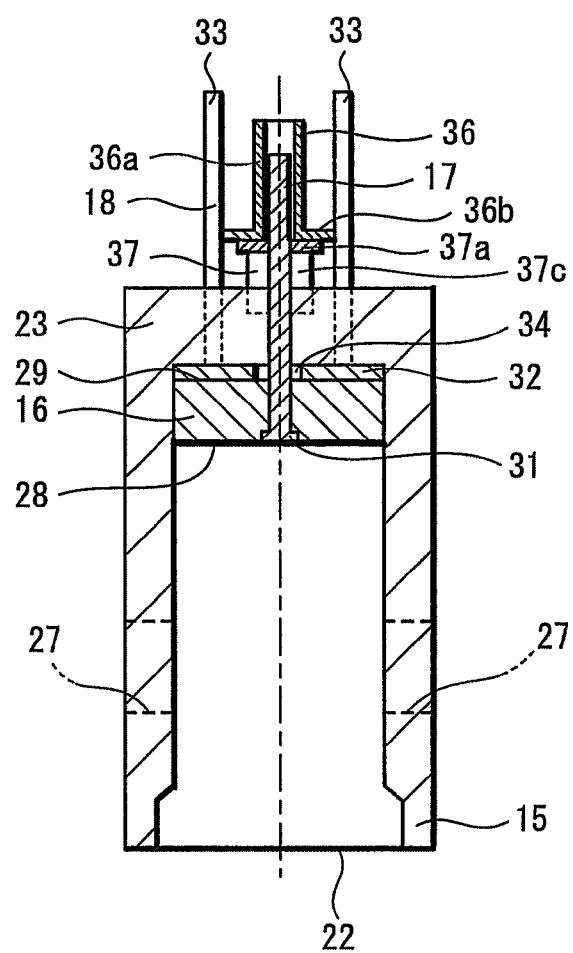

Next, the conductive pin 17 is inserted, from the side of the first surface 28 of the dielectric 16, through the hole 30, the opening hole 34 of the lead electrode 18, and the through-hole 25 of the main face portion 23 of the sleeve 15. As a result, as shown in FIGS. 4B to 4C, the one end portion of the conductive pin 17 projects to the outside from the through-hole 25 of the main face portion 23, and the pin head portion 31 of the conductive pin 17 is inserted into the recessed portion 10 formed in the first surface 28 of the dielectric 16. At this time, the pin head portion 31 abuts the bottom face of the recessed portion 10.

Next, as shown in FIG. 4B, the first leg portion 37b and the second leg portion 37c of the spring member 37 are respectively inserted into the two grooves 26, 26 formed in the main face portion 23, and thereby the spring member 37 is attached to the sleeve 15. At this time, the one end portion of the conductive pin 17 projects to the outside from the opening hole 38 formed in the plane portion 37a of the spring member 37. Further, the conductive pin 17 is inserted through the through-hole of the eyelet 36 so that the flange portion 36b of the eyelet 36 approaches the plane portion 37a of the spring member 37.

Figure 5A:
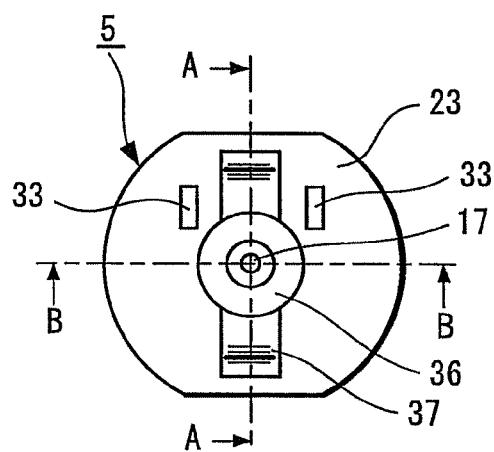
FIG. 5A to 5C show the first embodiment of the variable capacitor in a state after the conductive pin thereof is fixed to the joining portion thereof, where
Figure 5B:
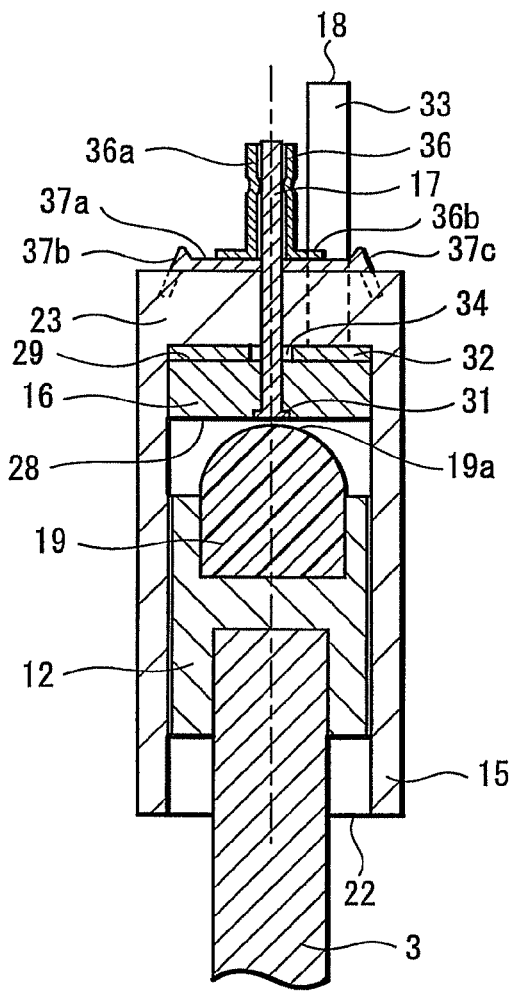
Figure 5C:
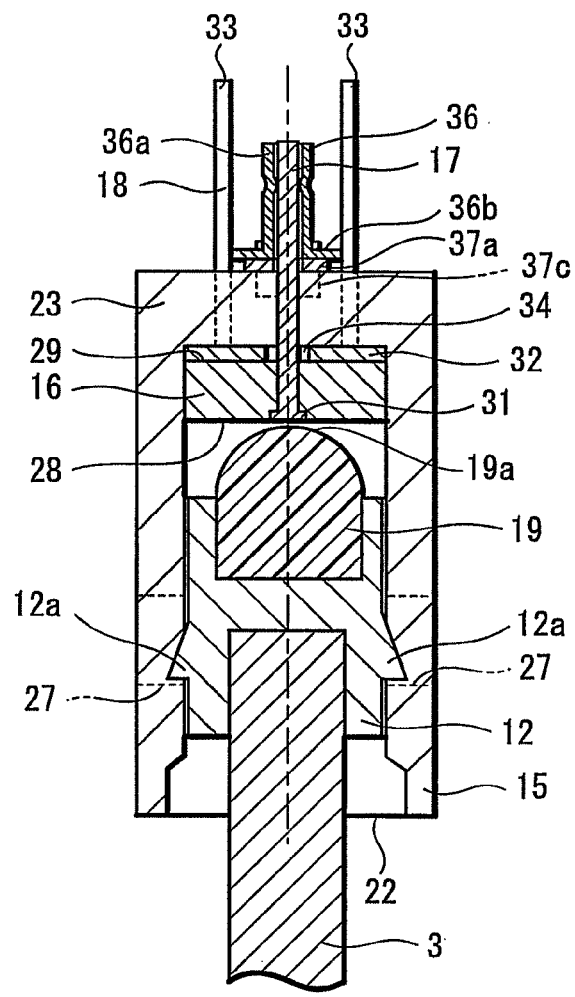

Further, as shown in FIGS. 5A to 5C, the eyelet 36 is pressed against the elastic force of the spring member 37, and thereby the spring member 37 is pressed toward the side of the main face portion 23 so that the plane portion 37a of the spring member 37 comes into contact with the main face portion 23 of the sleeve 15. In such a state, as shown in FIG. 5B, the tubular portion 36a of the eyelet 36 is crushed from the side face thereof so that the tubular portion 36a is caulked, and is fixed to the conductive pin 17. Due to the elastic force of the spring member 37, the conductive pin 17 is pulled outwardly (i.e., pulled in a direction away from the main face portion 23 of the sleeve 15).

At this time, the pin head portion 31 provided at the other end portion of the conductive pin 17 contacts the bottom of the recessed portion 10 formed in the first surface 28 of the dielectric 16. Thus, when the conductive pin 17 is pulled outwardly, the dielectric 16 is biased toward the side of the main face portion 23 of the sleeve 15 by the pin head portion 31. Here, since the electrode portion 32 of the lead electrode 18 is interposed between the dielectric 16 and the main face portion 23, the electrode portion 32 of the lead electrode 18 is also biased toward the side of the main face portion 23 of the sleeve 15 together with the dielectric 16. Since the electrode portion 32 of the lead electrode 18 is biased toward the side of the main face portion 23 of the sleeve 15, the second surface 29 of the dielectric 16 and the electrode portion 32 of the lead electrode 18 can contact each other more reliably. As a result, poor contact between the dielectric 16 and the lead electrode 18 can be prevented. Thus, pen pressure characteristics of the variable capacitor 5 can be improved.

Figure 3:
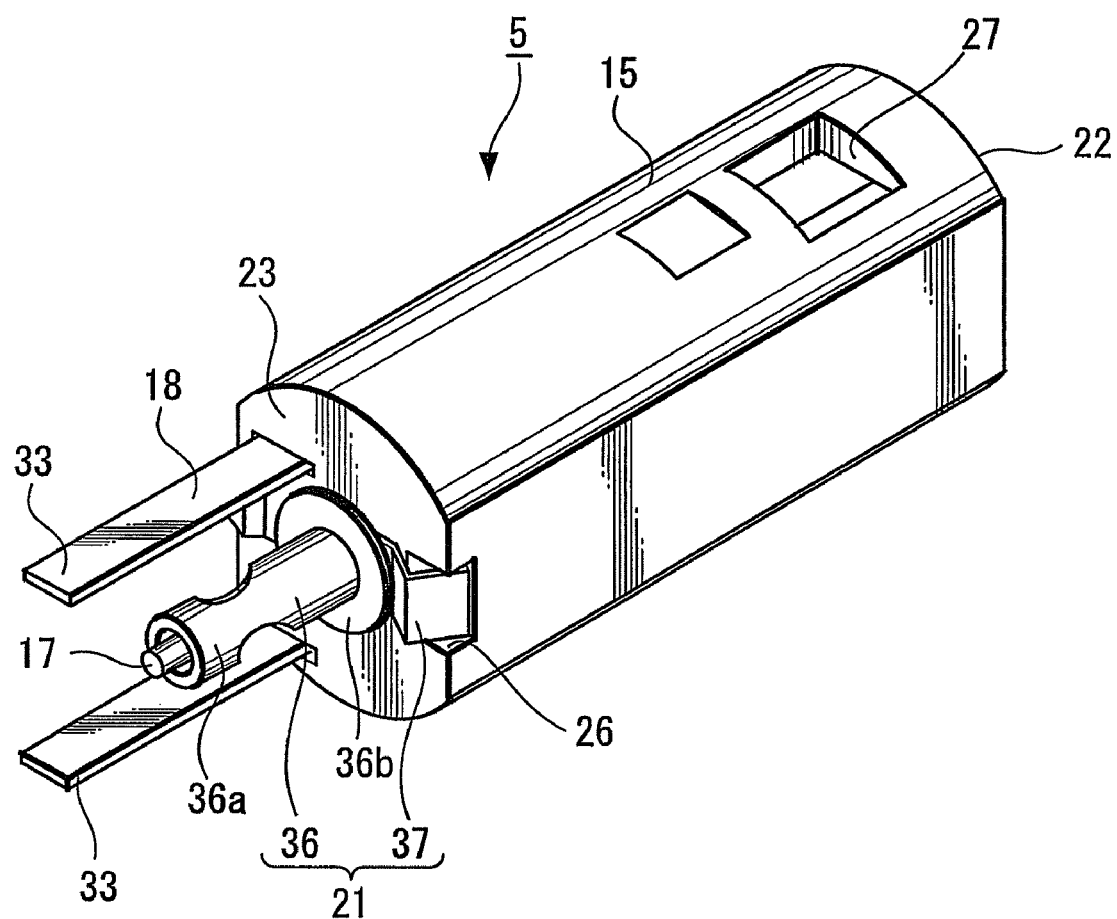
FIG. 3 is a perspective view showing the first embodiment of the variable capacitor according to the present invention.

Next, the rod holder 12 with the conductive elastic member 19 attached thereto is inserted into the sleeve 15 from the side of the opening 22. Further, as shown in FIG. 5C, the engaging portion 12a of the rod holder 12 is engaged to the engaged portion 27 of the sleeve 15. Thus, the tip end portion 19a of the conductive elastic member 19 approaches the first surface 28 of the dielectric 16 and the pin head portion 31 of the conductive pin 17, and therewith the assembling process of the variable capacitor 5 shown in FIG. 3 is completed.

As shown in FIGS. 4A to 5C, the conductive elastic member 19 is attached to the rod holder 12 to be housed in the sleeve 15. At this time, the tip end portion 19a of the conductive elastic member 19 approaches the first surface 28 of the dielectric 16 and the pin head portion 31 of the conductive pin 17. If a pressure is applied to the pen-tip 3a of the rod 3, the tip end portion 19a of the conductive elastic member 19 will be pressed by the first surface 28 of the dielectric 16 so as to be deformed (i.e., to be flattened), and therefore the contact area between the conductive elastic member 19 and the first surface 28 will increase. The flattened portion of the conductive elastic member serves as the second electrode. Since the contact area between the conductive elastic member 19 and the first surface 28 of the dielectric 16 varies corresponding to the pressure, the capacitance value of the variable capacitor 5 varies accordingly. Further, the capacitance value of the variable capacitor 5 is detected between the conductive pin 17 and the lead electrode 18. Thus, it is possible to detect the pressure applied to the pen-tip 3a.

Here, in the first embodiment, since the conductive pin 17 is pulled through the hole 30 formed substantially at the center of the dielectric 16, and the second surface 29 of the dielectric 16 and the electrode portion 32 of the lead electrode 18 contact each other flatly, the dielectric 16 is prevented from inclining or tilting. As a result, the dielectric 16 and the conductive elastic member 19 can contact each other uniformly or in a well-balanced manner. Thus, not only the pen pressure characteristics of the variable capacitor 5 can be improved, but also the configuration of the variable capacitor can be simplified.

Note that, although the first embodiment is described using an example in which the eyelet 36 and the conductive pin 17 are fixed to each other by crushing the side face of the tubular portion 36a of the eyelet 36 so that the tubular portion 36a is caulked and is fixed to the conductive pin 17, the present invention is not limited to that example but includes other configurations as long as the contact state between the second surface 29 of the dielectric 16 and the electrode portion 32 can be maintained. For example, the eyelet 36 and the conductive pin 17 may be fixed with each other by adhesive bonding, or the conductive pin 17 may be directly fixed to the sleeve 15 with an adhesive or the like without employing the eyelet 36.

Also, although the first embodiment is described using an example in which the electrode portion 32 of the lead electrode 18 is formed in a flat plate shape, the present invention is not limited to that example. For example, the electrode portion 32 may have a plurality of projections provided on one surface thereof to contact the second surface 29 of the dielectric 16. Due to the provision of the projections provided to the electrode portion 32, the electrode portion 32 is brought into point-contact with the second surface 29. As a result, even if defects such as warping and/or floating are generated in the electrode portion 32 due to insufficient accuracy of press working, the second surface 29 of the dielectric 16 and the electrode portion 32 of the lead electrode 18 can be reliably brought into contact with each other without being adversely affected by the warping and/or floating. In such a case, in order for the dielectric 16 to contact the electrode portion 32, it is preferred that the number of the projections is set to three or more.

Figure 6:
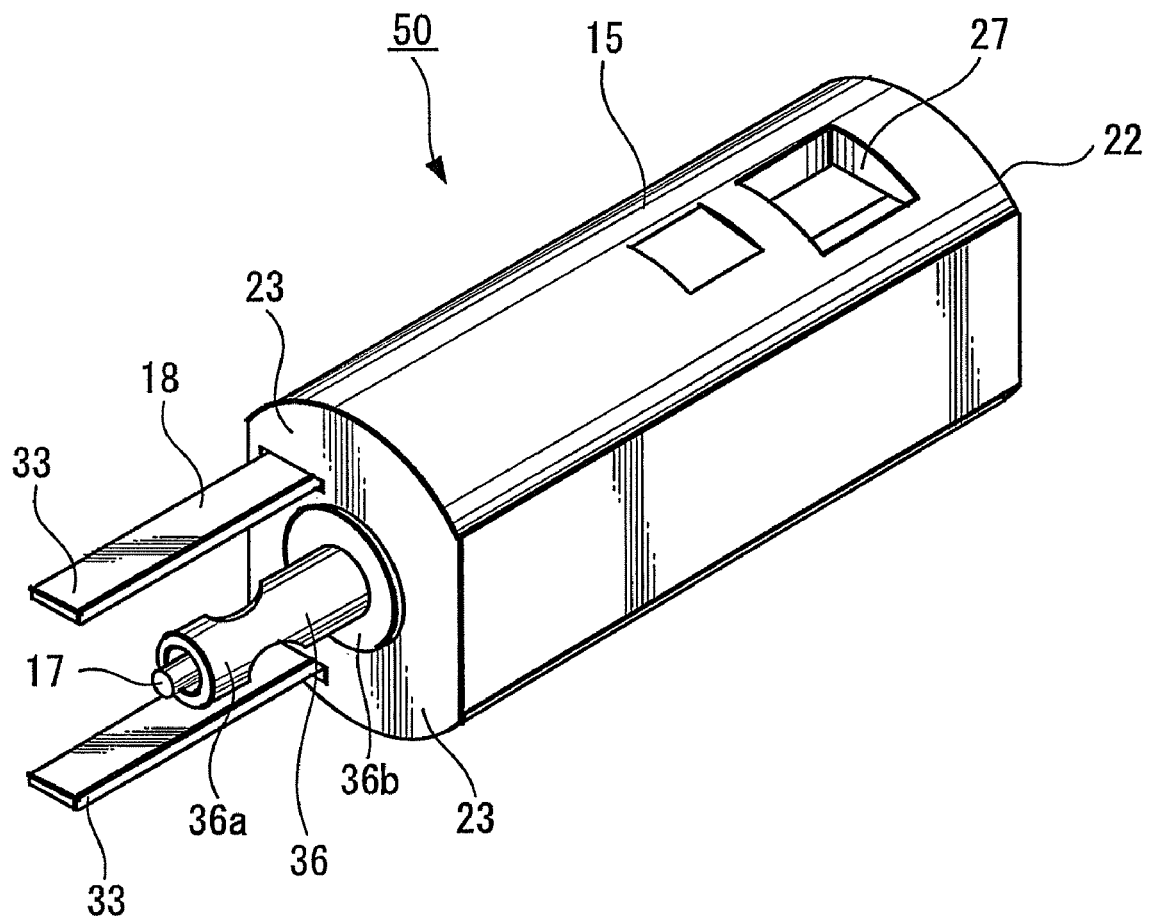
FIG. 6 is a perspective view showing a second embodiment of the variable capacitor according to the present invention.

A second embodiment of the variable capacitor according to the present invention will be described below with reference to FIGS. 6 to 7B.

A variable capacitor 50 of the second embodiment differs from the variable capacitor 5 of the first embodiment in that the spring portion and the joining portion forming the biasing member 21 are integrally formed. Specifically, instead of having the spring member 37 shown in FIGS. 4A to 4C, the flange portion 36b of the eyelet 36 is formed in a sucker shape as shown in FIG. 7A so as to have elasticity. Further, as shown in FIG. 7B, the eyelet 36 is fixed to the conductive pin 17 in a state where the flange portion 36b is pressed toward the side of the main face portion 23 of the sleeve 15 against the elastic force. With such an arrangement, similar to the first embodiment, the conductive pin 17 can be pulled outwardly of the sleeve 15, in a direction away from the main face portion 23 of the sleeve 15.

Other portions of the variable capacitor 50 of the second embodiment are identical to those of the variable capacitor 5 of the first embodiment, and therefore the description thereof will be omitted. The same advantages as the variable capacitor 5 of the first embodiment can also be achieved with the variable capacitor 50 having such an arrangement. Further, in the variable capacitor 50 of the second embodiment, the tubular portion 36a of the eyelet 36 serves as the joining portion while the flange portion 36b of the eyelet 36 serves as the spring portion. As a result, the components corresponding to the spring member 37 can be reduced or omitted compared with the variable capacitor 5 of the first embodiment.

Figure 8:
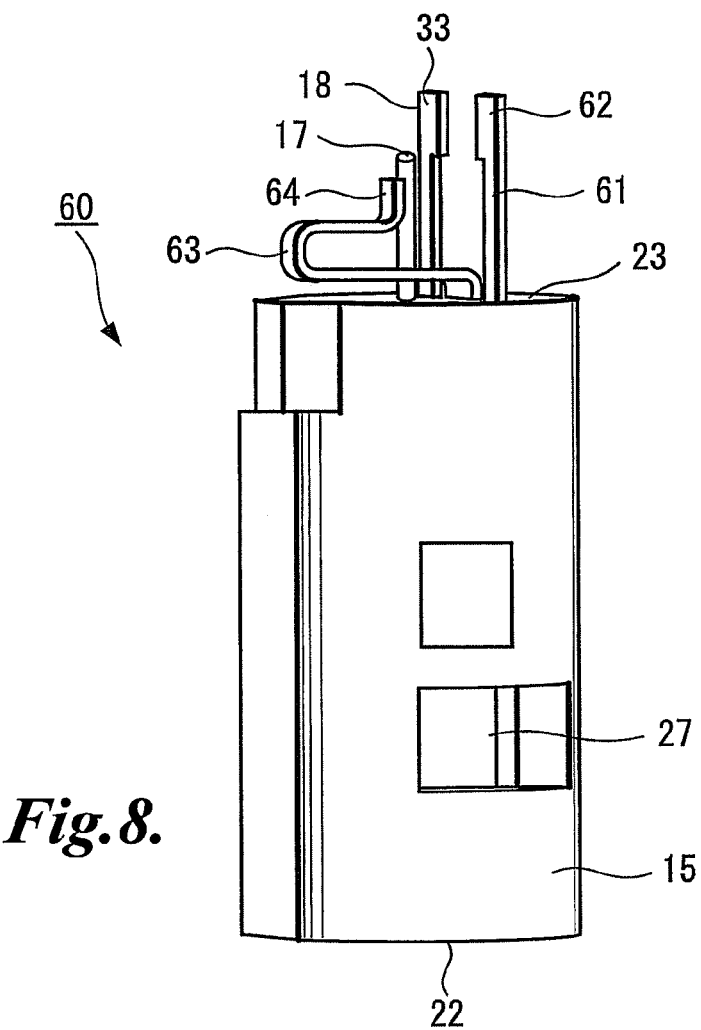
FIG. 8 is a perspective view showing a third embodiment of the variable capacitor according to the present invention.

A third embodiment of the variable capacitor according to the present invention will be described below with reference to FIGS. 8 to 10B. As shown in FIG. 8, in a variable capacitor 60 of the third embodiment, there is only one terminal piece 33 of the lead electrode 18, and a second lead electrode 61 is provided to electrically connect the conductive pin 17 to the electronic components of the printed circuit board 7.

Figure 9:
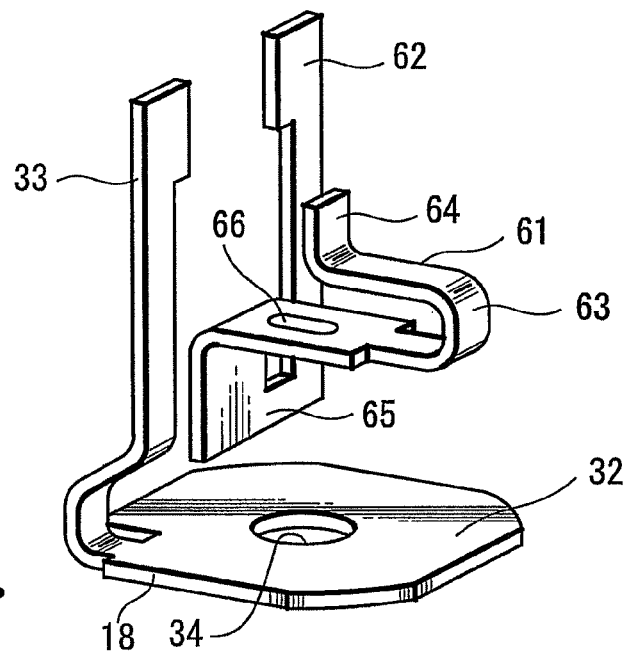
FIG. 9 is a perspective view showing a lead electrode and a second lead electrode of the third embodiment of the variable capacitor according to the present invention.

As shown in FIG. 9, the second lead electrode 61 is a substantially U-shaped member. One of the two longer sides of the U-shaped second lead electrode 61 is bent. The second lead electrode 61 includes a terminal piece 62, a spring portion 63 and a connecting portion 65. The terminal piece 62 of the second lead electrode 61 is connected to a contact point of the printed circuit board 7 by means of, for example, resistance welding, ultrasonic welding or the like. The spring portion 63 is another concrete example of the biasing member. The connecting portion 65 is a member for connecting the terminal piece 62 with the spring portion 63. Further, as shown in FIGS. 10A and 10B, the connecting portion 65 of the second lead electrode 61 is fixed to the main face portion 23 of the sleeve 15.

The spring portion 63 is substantially bent into a U-shape. One end of the substantially U-shaped spring portion 63 is further bent substantially vertically to form a joining portion 64. The one end portion of the conductive pin 17 is fixed to the joining portion 64 by means of, for example, welding or the like. Further, the spring portion 63 is formed with an opening hole 66 through which the conductive pin 17 is passed. In a state where the spring portion 63 is contracted or compressed against the elastic force thereof, the one end portion of the conductive pin 17 is inserted through the opening hole 66, and the one end portion of the conductive pin 17 is fixed to the joining portion 64. By fixing the one end portion of the conductive pin 17 to the joining portion 64, the conductive pin 17 is pulled in a direction away from the main face portion 23 of the sleeve 15 similar to the first embodiment.

Further, in the third embodiment, instead of connecting the conductive pin 17 to a contact point of the printed circuit board 7 (see FIG. 1), the terminal piece 62 of the second lead electrode 61 is connected to a contact point by means of resistance welding, ultrasonic welding or the like. The conductive pin 17 is electrically connected to the electronic components of the printed circuit board 7 through the second lead electrode 61. As a result, the capacitance value of the variable capacitor 60 can be detected between the lead electrode 18 and the second lead electrode 61.

Further, in the third embodiment, the sleeve 15, the lead electrode 18, and the second lead electrode 61 are integrally formed by means of, for example, hoop molding method. By integrally forming the sleeve 15, the lead electrode 18, and the second lead electrode 61 using the hoop molding method, it becomes possible to press-form the lead electrode 18 and the second lead electrode 61 and injection-mold the sleeve 15 in one process. Thus, the work of attaching the lead electrode 18 and the second lead electrode 61 to the sleeve 15 can be eliminated, and assembling process can be simplified.

Other portions of the variable capacitor 60 of the third embodiment are identical to those of the variable capacitor 5 of the first embodiment, and therefore the description thereof will be omitted. The same advantages as the variable capacitor 5 of the first embodiment can also be achieved with the variable capacitor 60 having such an arrangement.

Figure 11:
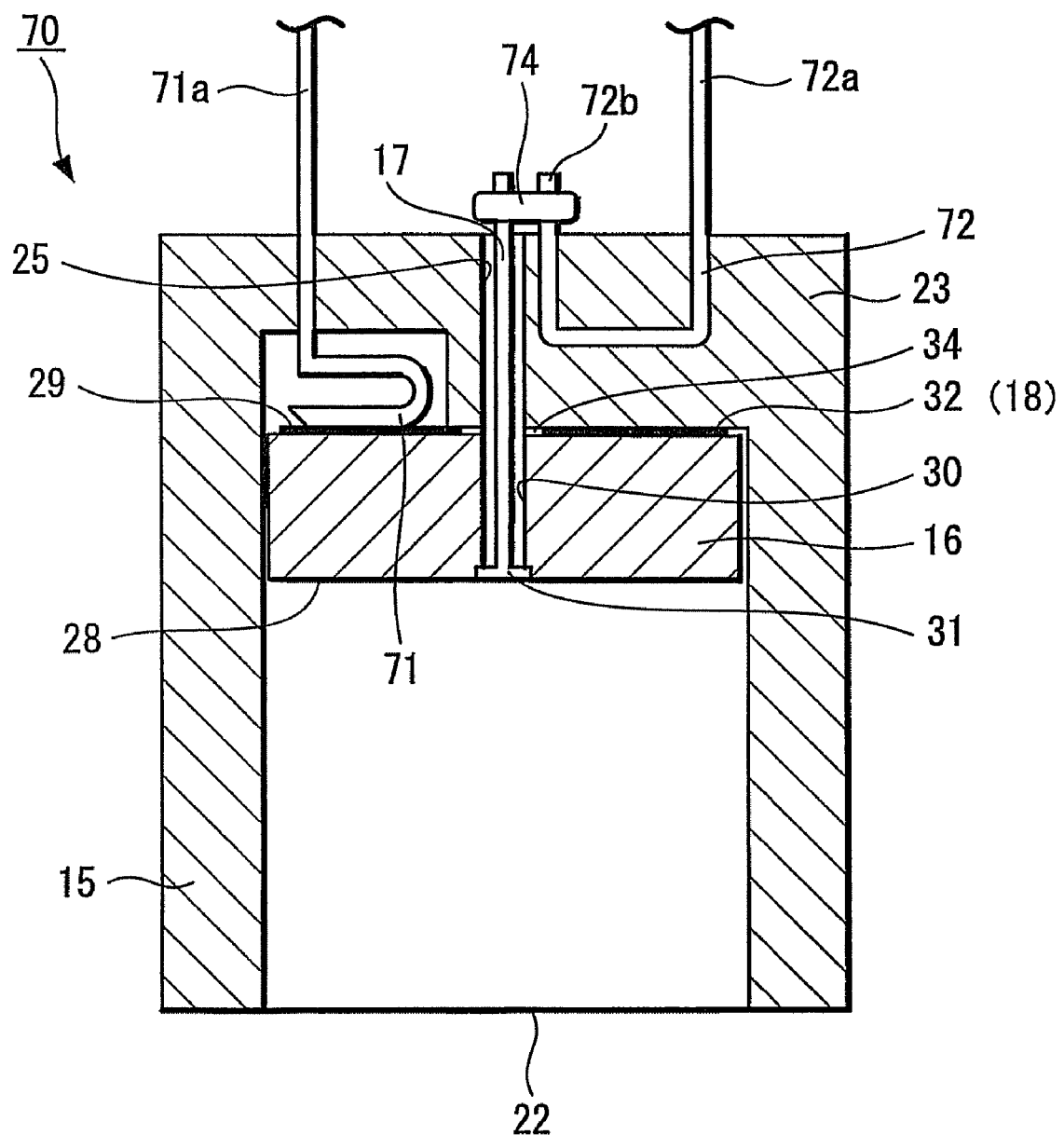
FIG. 11 is a cross section showing a fourth embodiment of the variable capacitor according to the present invention.
Figure 12:
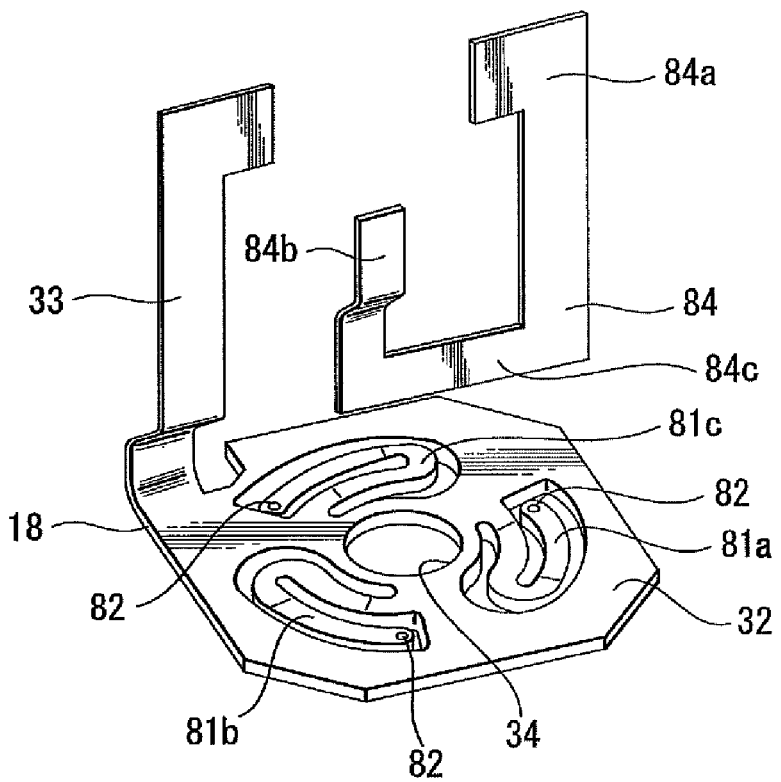
FIG. 12 is a perspective view showing a lead electrode and a second lead electrode of a fifth embodiment of the variable capacitor.
Figure 13:
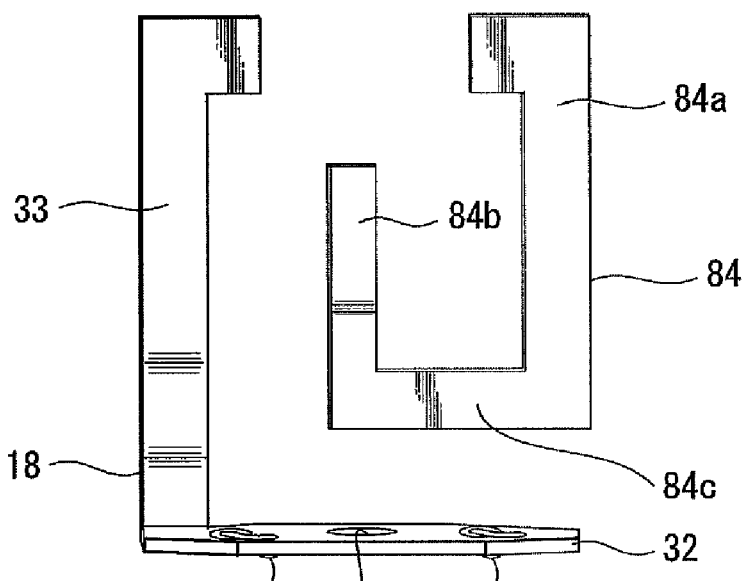
FIG. 13 is a front view showing the lead electrode and the second lead electrode of FIG. 12.
Figure 14:
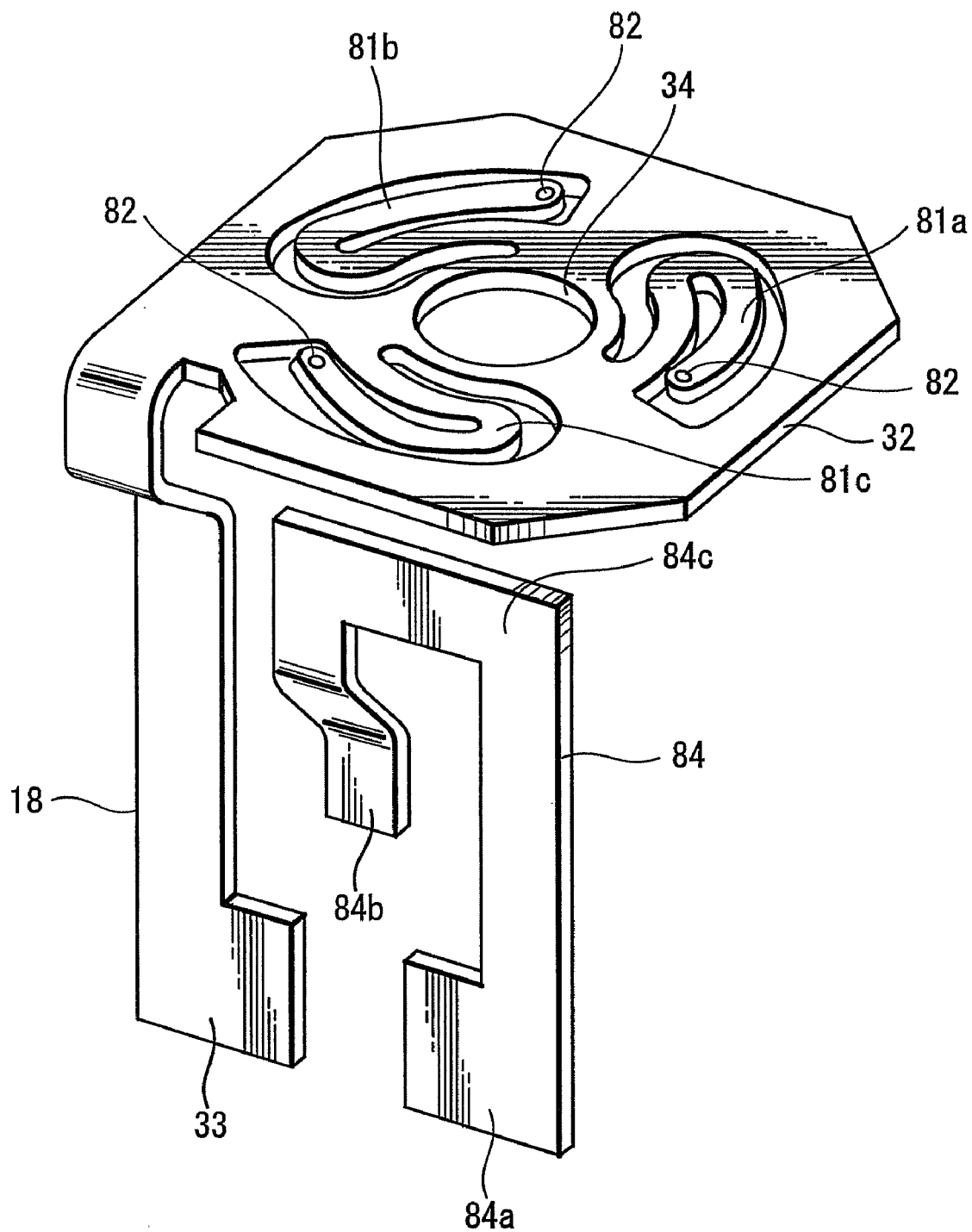
FIG. 14 is a perspective view showing the lead electrode and the second lead electrode of FIG. 12 when viewed from the opposite side.
Figure 15:
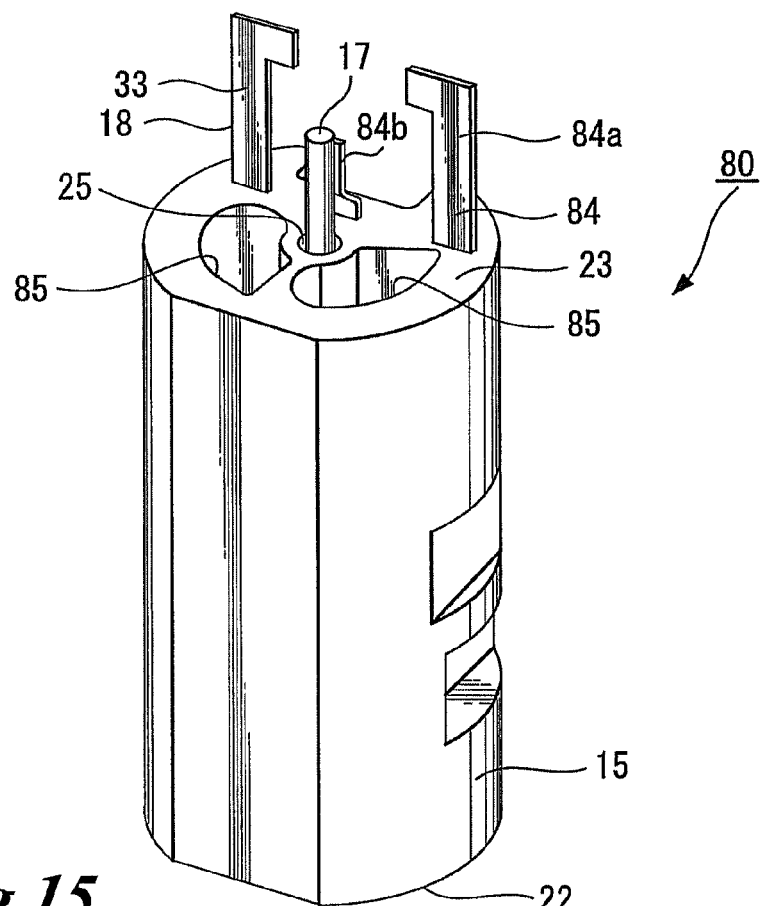
FIG. 15 is a perspective view showing the fifth embodiment of the variable capacitor according to the present invention.
Figure 16:
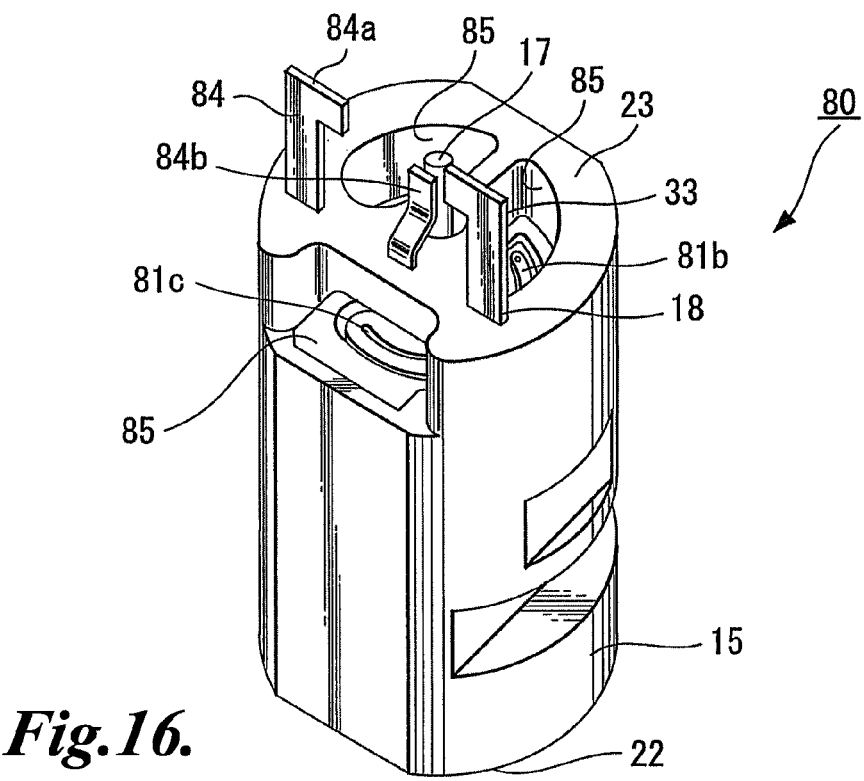
FIG. 16 is a perspective view showing the variable capacitor of FIG. 15 when viewed from the opposite side.

A fourth embodiment of the variable capacitor according to the present invention will be described below with reference to FIG. 11. In the variable capacitor 70 according to the fourth embodiment, the biasing member is arranged on the side of the lead electrode 18. Specifically, as shown in FIG. 11, the electrode portion 32 of the lead electrode 18 is provided with, on its surface facing the main face portion 23 of the sleeve 15, a spring portion 71.

The spring portion 71 is substantially bent into a U-shape. One end of the substantially U-shaped spring portion 71 is attached to the electrode portion 32 by fixing means such as welding. A terminal piece 71a is continuously arranged on the other end of the spring portion 71. Similar to the first embodiment, the terminal piece 71a of the spring portion 71 is projected to the outside from the main face portion 23 of the sleeve 15 to be electrically connected to the printed circuit board 7. Note that, although the fourth embodiment is described using an example in which the spring portion 71 and the lead electrode 18 are separately formed, the spring portion 71 and the lead electrode 18 may also be integrally formed by, for example, press working. By integrally forming the spring portion 71 and the lead electrode 18 by press working, for example, the work of welding the spring portion 71 to the lead electrode 18 can be eliminated. As a result, the assembling process can be simplified.

Further, the variable capacitor 70 according to the fourth embodiment has a second lead electrode 72. The second lead electrode 72 is a substantially J-shaped member. The second lead electrode 72 has a terminal piece 72a at one end thereof and a joining portion 72b at the other end thereof. The terminal piece 72a is connected to a contact point (not shown) of the printed circuit board 7 (see FIG. 1) by means of, for example, resistance welding, ultrasonic welding or the like. The joining portion 72b is connected to the one end portion of the conductive pin 17 by fixing means such as, for example, a welding 74. Thus, similar to the third embodiment, in the fourth embodiment, the capacitance value of the variable capacitor 70 can be detected between the lead electrode 18 and the second lead electrode 72.

Herein, the pin head portion 31 of the conductive pin 17 is inserted into the recessed portion of the dielectric 16. As a result, as shown in FIG. 11, the dielectric 16 is fixed to the main face portion 23 inside the sleeve 15. Further, in the variable capacitor 70 of the fourth embodiment, due to the elastic force of the spring portion 71, the electrode portion 32 of the lead electrode 18 is biased to a direction away from the main face portion 23 of the sleeve 15, namely, is biased to the side of the second surface 29 of the dielectric 16. With such an arrangement, in the fourth embodiment, the electrode portion 32 of the lead electrode 18 can be reliably brought into contact with the second surface 29 of the dielectric 16.

Other portions of the variable capacitor 70 of the fourth embodiment are identical to those of the variable capacitor 5 of the first embodiment, and therefore the description thereof will be omitted. The same advantages as the variable capacitor 5 of the first embodiment can also be achieved with the variable capacitor 70 having such an arrangement.

A fifth embodiment of the variable capacitor according to the present invention will be described below with reference to FIGS. 12 to 16. In a variable capacitor 80 of the fifth embodiment, there is only one terminal piece 33 of the lead electrode, and a plurality of spring portions 81 serving as biasing members are formed in the electrode portion 32.

The electrode portion 32 of the lead electrode 18 is provided with three spring portions 81a, 81b, 81c. The three spring portions 81a, 81b, 81c are arranged at equal angle intervals with the opening hole 34 as the center. The three spring portions 81a, 81b, 81c are in substantially U-shape formed by cutting out three predetermined places of the electrode portion 32. The tip end portions of the three spring portions 81a, 81b, 81c are respectively flexed in a direction opposite to the terminal piece 33, so that the three spring portions 81a, 81b, 81c have elasticity. In the fifth embodiment, the flexure of the spring portions 81 is set to, for example, 0.3 mm from the electrode portion 32, and the contact pressure is set to, for example, 100 g in total (herein, the thickness of the electrode portion 32 is, for example, 0.12 mm, and the material of the electrode portion 32 is, for example, silver-plated titanium copper). Further, each of the three spring portions 81a, 81b, 81c is provided with a projecting portion 82 (at its tip end portion) projecting in a direction opposite to the terminal piece 33.

Also, although the fifth embodiment is described using an example in which the electrode portion 32 is provided with three spring portions, the number of the spring portion can be one, two, four or more than four.

Further, the variable capacitor 80 of the fifth embodiment is also provided with a second lead electrode 84 contacting the one end portion of the conductive pin 17. The second lead electrode 84 is substantially J-shaped. The second lead electrode 84 includes a terminal piece 84a, a joining portion 84b, and a connecting portion 84c. The terminal piece 84a is arranged at one end portion of the second lead electrode 84. The terminal piece 84a is connected to a contact point (not shown) of the printed circuit board 7 by means of, for example, resistance welding, ultrasonic welding or the like. The joining portion 84b is arranged at the other end portion of the second lead electrode 84. The joining portion 84b is connected to the one end portion of the conductive pin 17 by fixing means such as, for example, welding. The connecting portion 84c connects the terminal piece 84a and the joining portion 84b.

Further, in the variable capacitor 80 of the fifth embodiment, the sleeve 15, the lead electrode 18, and the second lead electrode 84 are integrally formed by means of, for example, hoop molding method. The electrode portion 32 of the lead electrode 18 is fixed to the main face portion 23 of the sleeve 15. In a state where the electrode portion 32 of the lead electrode 18 is fixed to the main face portion 23 of the sleeve 15, the projecting portion 82 of each of the three spring portions 81a, 81b, 81c projects from the inner surface of the main face portion 23 toward the inside of the sleeve 15. Three cast holes 85, 85, 85 are formed in the main face portion 23 of the sleeve 15 at places corresponding to the three spring portions 81a, 81b, 81c. The three cast holes 85, 85, 85 are formed by injection-molding using molding dies.

Other portions of the variable capacitor 80 of the fifth embodiment are identical to those of the variable capacitor 5 of the first embodiment, and therefore the description thereof will be omitted. The same advantages as the variable capacitor 5 of the first embodiment can also be achieved with the variable capacitor 80 having such an arrangement.

In the variable capacitor 80 of the fifth embodiment, the three spring portions 81 are formed in the electrode portion 32 at equal angle intervals. By forming the three spring portions 81 at equal angle intervals, pressure can be applied to the dielectric 16 without unevenness. As a result, the second surface 29 of the dielectric 16 and the electrode portion 32 can contact each other in a well-balanced manner. Further, owing to the provision of the spring portions 81 of the electrode portion 32, the dielectric 16 can be prevented from inclining or tilting, and therefore the contact surface between the dielectric 16 and the conductive elastic member 19 can be prevented from inclining or tilting. Further, since the projecting portion 82 is provided at the tip end of each of the spring portions 81, the spring portions 81 are brought into point-contact with the second surface 29. As a result, even if defects such as warping and/or floating caused by insufficient accuracy of press working are generated in the electrode portion 32, the dielectric 16 and the electrode portion 32 can be reliably brought into contact with each other without being adversely affected by the warping and/or floating.

Further, since the spring portions 81 are formed in U-shape, the spring portions 81 can be lengthened. As a result, the reaction force of the spring portions 81 can be prevented from being excessively increased. Thus, the pen pressure characteristics of the position indicator 1 can be prevented from being adversely affected by excessively increased reaction force of the spring portions 81.

Other embodiments of the conductive elastic member of the variable capacitor according to the present invention will be described below with reference to FIGS. 17 to 30. Incidentally, in the following description, like components are denoted by like numerals as of the aforesaid embodiments of the variable capacitor, and detailed explanation thereof will be omitted.

Figure 17:
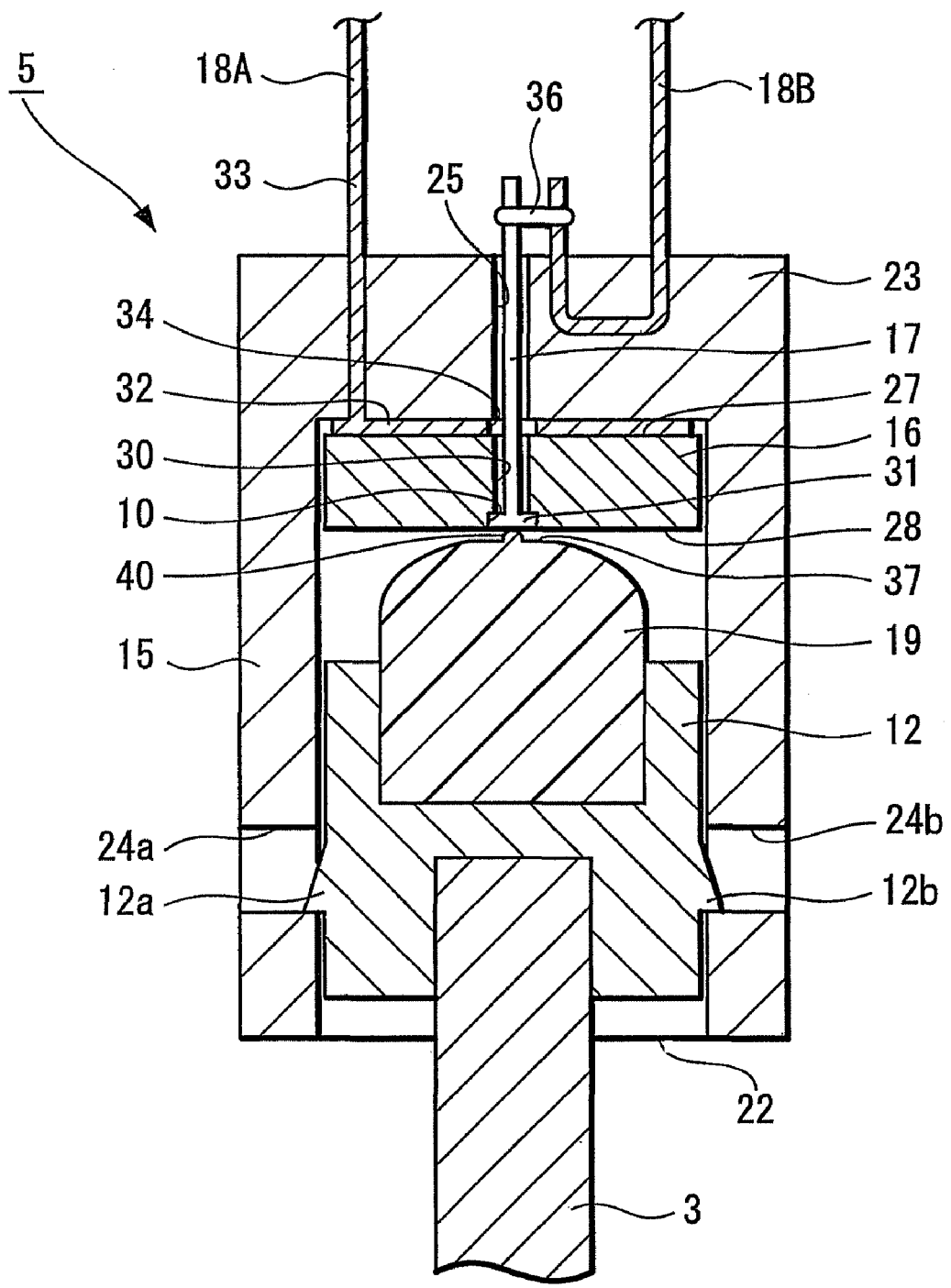
FIG. 17 is a cross section showing another embodiment of a conductive elastic member of the variable capacitor according to the present invention.

One of embodiments of the conductive elastic member of the variable capacitor according to the present invention will be described below with reference to FIG. 17. As shown in FIG. 17, a variable capacitor 5 includes a sleeve 15, a dielectric 16, a conductive pin 17, two lead electrodes 18A, 18B, and a conductive elastic member 19. The present embodiment differs from the aforesaid first embodiment in that the conductive elastic member 19 is provided with, at the tip-end portion thereof, a projection 40.

Figure 18:
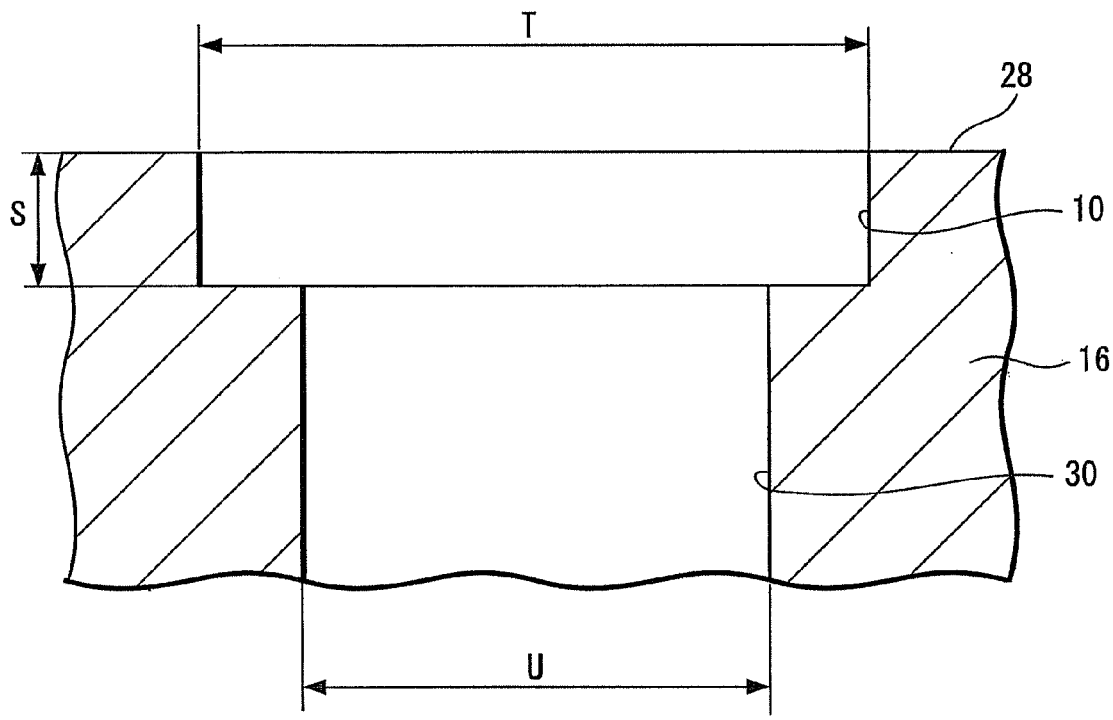
FIG. 18 is an enlarged cross section showing a primary portion of a dielectric of the variable capacitor according to the present invention.

FIG. 18 is an enlarged cross section showing a primary portion of the dielectric 16 of the variable capacitor 5. FIG. 18 is a cross section taken along axis of the dielectric 16 and showing dimensions of the hole 30 and the recessed portion 10. The diameter of the hole 30 is set to U, and the diameter of the recessed portion 10 is set to T. Considering the dimension tolerance when performing machining work, the depth S of the recessed portion 10 is set to $S_{MIN} < S < S_{MAX}$.

Figure 19:
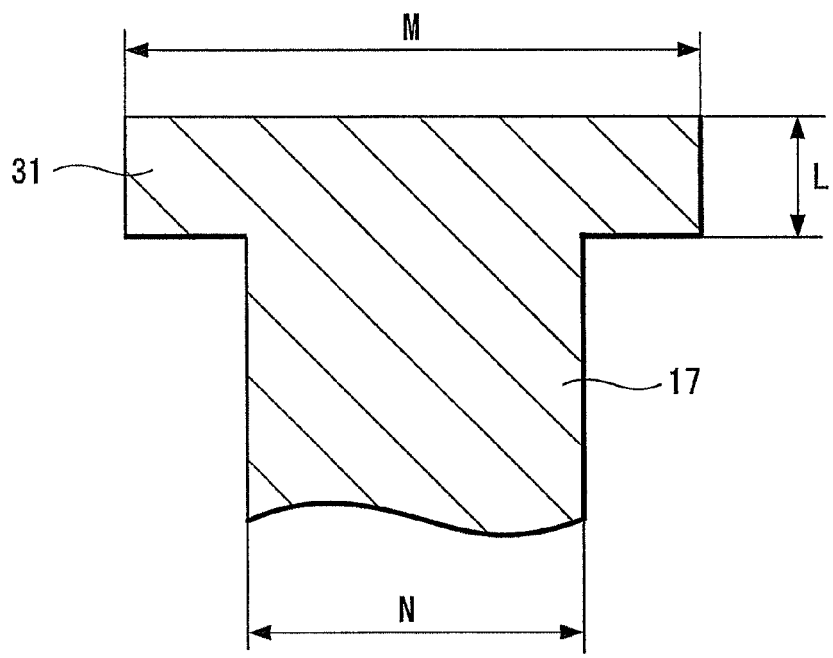
FIG. 19 is an enlarged cross section showing a primary portion of the conductive pin of the variable capacitor according to the present invention.

FIG. 19 is an enlarged cross section showing a primary portion of the conductive pin 17 of the variable capacitor according to the present invention.

The shaft diameter of the conductive pin 17 is set to N, and the diameter of the pin head portion 31 is set to M. Considering the dimension tolerance when performing machining work, the thickness L of the pin head portion 31 is set to $L_{MIN} < L < L_{MAX}$.

Figure 20:
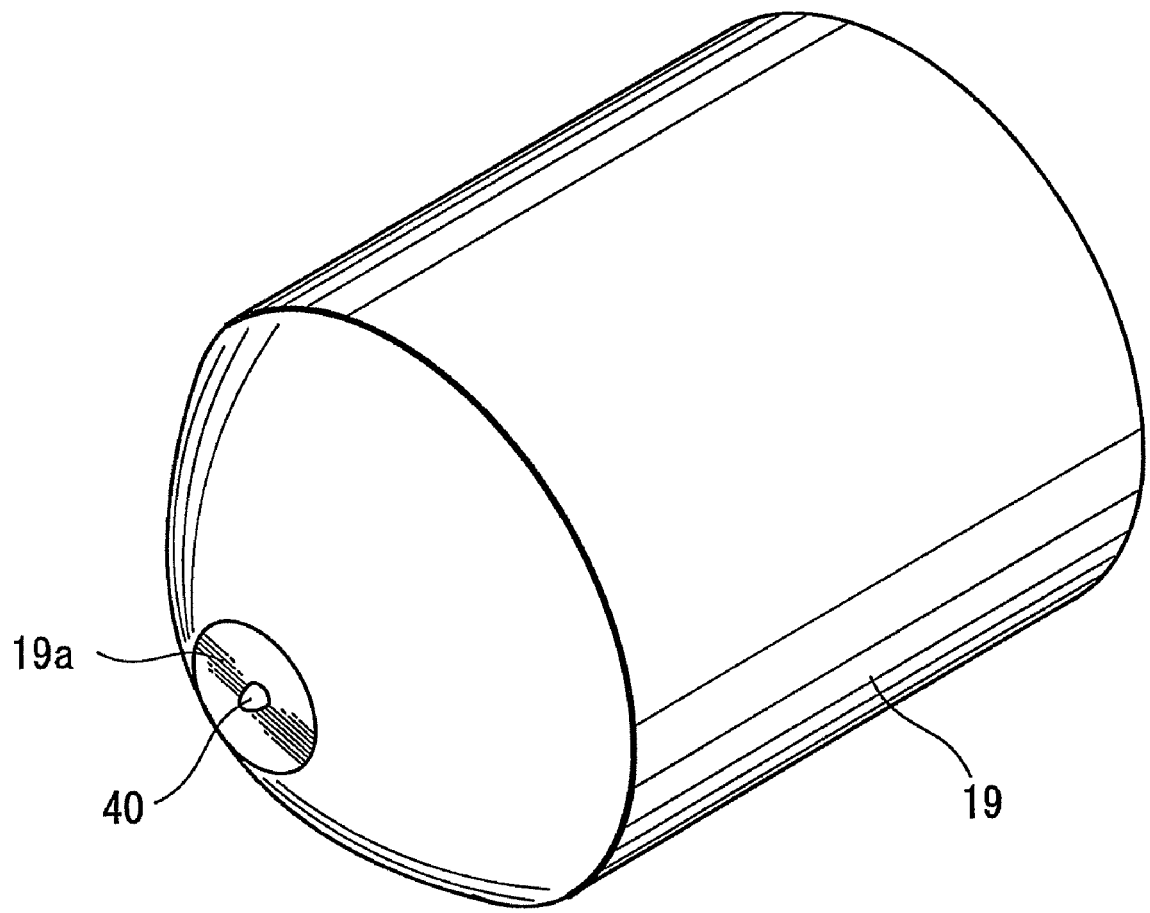
FIG. 20 is a perspective view showing the conductive elastic member of the variable capacitor shown in FIG. 17.

FIG. 20 is a perspective view showing the conductive elastic member 19 of the variable capacitor shown in FIG. 17. One end portion in the axial direction of the conductive elastic member 19 is formed in a dome shape, and the other end portion of the conductive elastic member 19 is formed in a cylindrical shape. A tip end portion 19a' is formed on the one end portion of the conductive elastic member 19. The tip end portion 19a' is a substantially circular plane portion substantially parallel to a bottom face at the other end of the conductive elastic member 19. The diameter E of the tip end portion 19a' is equal to or slightly larger than the diameter of the recessed portion 10 of the dielectric 16 (i.e., E≧T).

The tip end portion 19a' is provided, at substantially the center thereof, a substantially semispherical small projection 40 projecting toward one side in the axial direction. Since the projection 40 is formed in a substantially semispherical shape, a load (i.e., a pressure) applied to the projection 40 can be dispersed in a uniform, well balanced way. As a result, the service life of •the projection 40 can be prolonged. The height of the projection 40 is set equal to or slightly larger than a dimension difference P between the maximum allowable dimension $S_{MAX}$ of the recessed portion 10 of the dielectric 16 and the minimum allowable dimension $L_{MIN}$ of the pin head portion 31 of the conductive pin 17. Further, the radius of the projection 40 is set to be smaller than the radius of the recessed portion 10 of the dielectric 16. Further, the projection 40 can be easily deformed by a small load lower than 5 g. The material of the conductive elastic member 19 is, for example, a silicone conductive rubber, a pressure sensitive conductive rubber or the like.

Figure 21:
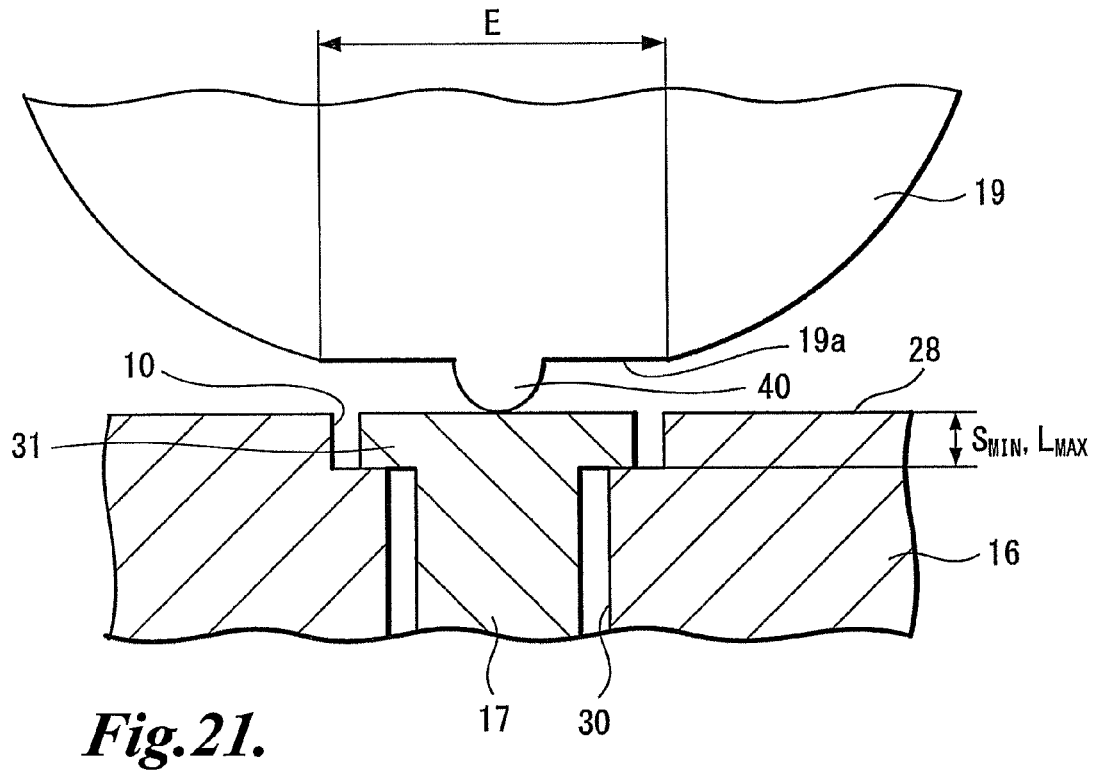
FIG. 21 is an enlarged cross section showing a primary portion of the variable capacitor according to the present invention where the depth of a recessed portion of the dielectric is set to the minimum value, and the thickness of a pin head portion of the conductive pin is set to the maximum value.
Figure 22:
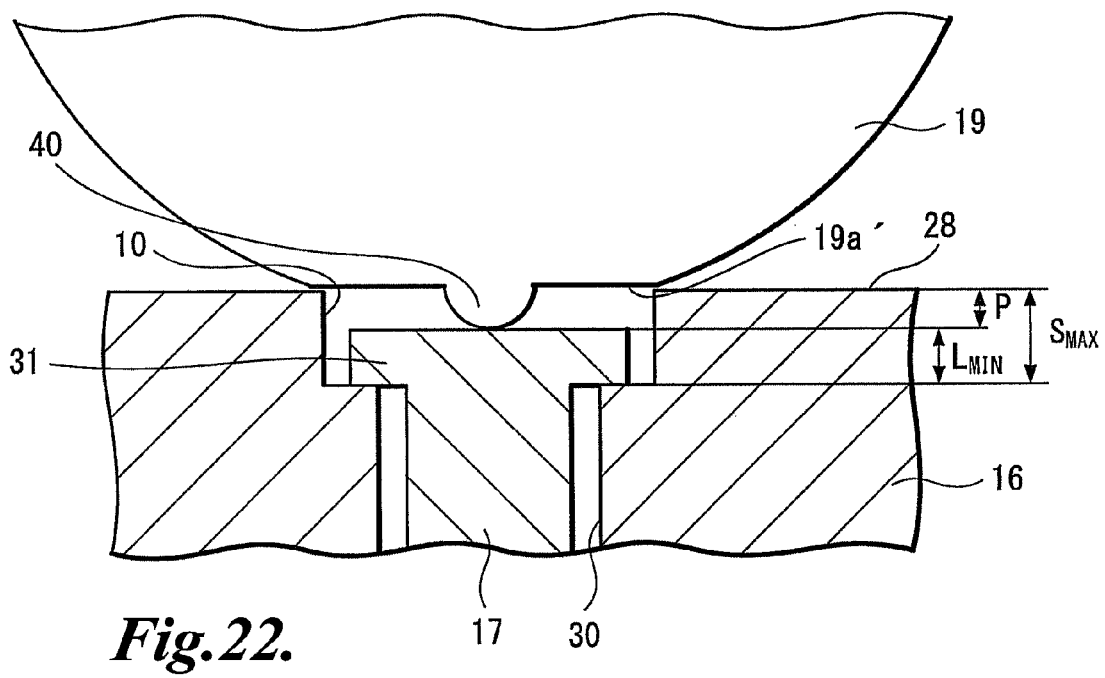
FIG. 22 is an enlarged cross section showing a primary portion of the variable capacitor according to the present invention where the depth of the recessed portion of the dielectric is set to the maximum value, and the thickness of the pin head portion of the conductive pin is set to the minimum value.

FIGS. 21 and 22 show dimensions of various portions. The dimensions of the pin head portion 31 and the recessed portion 10 are set so that if the depth of the recessed portion 10 is the minimum allowable dimension $S_{MIN}$, and the thickness of the pin head portion 31 is the maximum allowable dimension $L_{MAX}$, then $S_{MIN} = L_{MAX}$, so that the pin head portion 31 does not project to the outside of the dielectric 16 from the recessed portion 10. When the depth of the recessed portion 10 is the maximum allowable dimension $S_{MAX}$ and the thickness of the pin head portion 31 is the minimum allowable dimension $L_{MIN}$, the dimension difference between the recessed portion 10 and the pin head portion 31 is P.

The conductive elastic member 19 having such an arrangement is housed in the sleeve 15 after the cylindrical portion at the other end thereof has been attached to the rod holder 12. Thus, the conductive elastic member 19 is attached to the other end portion in the axial direction of the rod 3 through the rod holder 12. The conductive elastic member 19 is arranged so that the dome-shaped one end of the conductive elastic member 19 approaches the first surface 28 of the dielectric 16 and the pin head portion 31 of the conductive pin 17. As a result, the tip end portion 19a' of the conductive elastic member 19 faces the recessed portion 10 of the first surface 28 substantially in parallel. Further, the tip end portion 19a' of the conductive elastic member 19 also faces the pin head portion 31 of the conductive pin 17 substantially in parallel. Further, the projection 40 of the conductive elastic member 19 is arranged so as to face the pin head portion 31 of the conductive pin 17.

In such a state, when a pressure is applied to the pen-tip 3a of the rod 3, not only the projection 40 of the conductive elastic member 19 comes into contact with the pin head portion 31 of the conductive pin 17, but also the tip end portion 19a' comes into contact with a peripheral edge portion of the recessed portion 10. Thus, the pin head portion 31 of the conductive pin 17 is electrically connected to the conductive elastic member 19. In such a state, when a further higher pressure is applied to the pen-tip 3a of the rod 3, the projection 40 of conductive elastic member 19 will be completely crushed, so that the tip end portion 19a' of the conductive elastic member 19 is brought into contact with the first surface 28. Consequently, the contact area between the tip end portion 19a' of the conductive elastic member 19 and the first surface 28 of the dielectric 16 varies. As a result, the capacitance value of the variable capacitor 5 varies due to the variation of the facing area between the first electrode portion 32 and the conductive elastic member 19. Further, the capacitance value of the variable capacitor 5 is detected between conductive pin 17 and the first lead electrode 18A. In such a state, if a further higher pressure is applied to the pen-tip 3a of the rod 3, the tip end portion 19a' of the conductive elastic member 19 will be subjected to a further higher pressure, and therefore the conductive elastic member 19 will be further flattened. Thus, the contact area between the tip end portion 19a' of the conductive elastic member 19 and the first surface 28 will increase. As a result, the facing area between the first electrode portion 32 and the conductive elastic member 19 will further increase, and therefore the capacitance value of the variable capacitor 5 will further increase. In this manner, the variation of the pressure applied to the pen-tip 3a can be detected.

Figure 23:
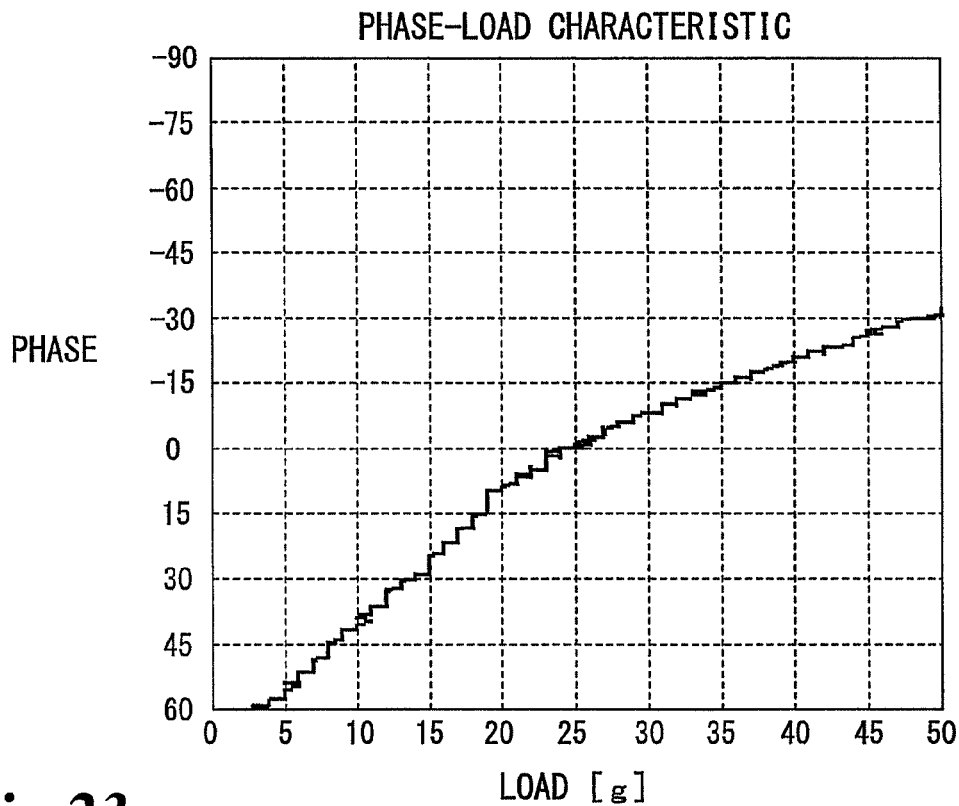
FIG. 23 is a graph showing the phase-load characteristic of the variable capacitor shown in FIG. 21.
Figure 24:
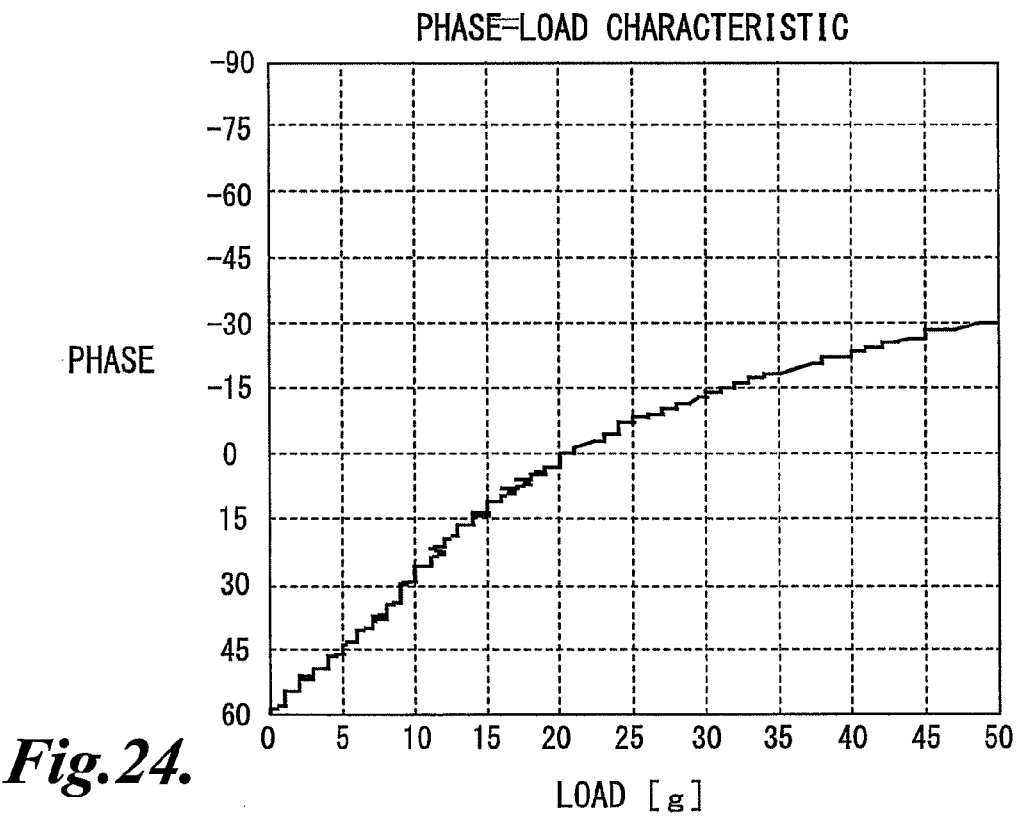
FIG. 24 is a graph showing the phase-load characteristic of the variable capacitor shown in FIG. 22.

The detection accuracy of the pressure of the variable capacitor 5 will be described below with reference to FIGS. 21 to 24. Here, in FIG. 21, the depth of the recessed portion 10 of the dielectric 16 is set to the minimum value $S_{MIN}$, and the thickness of the pin head portion 31 of the conductive pin 17 is set to the maximum value $L_{MAX}$. In FIG. 22, the depth of the recessed portion 10 of the dielectric 16 is set to the maximum value $S_{MAX}$, and the thickness of the pin head portion 31 of the conductive pin 17 is set to the minimum value $L_{MIN}$. FIGS. 23 and 24 are graphs each showing a phase-load characteristic of the variable capacitor 5 where the horizontal axis represents the load applied to the rod 3, and the vertical axis represents a phase. FIG. 23 is the graph plotted based on the recessed portion 10 and the pin head portion 31 having the dimensions shown in FIG. 21, and FIG. 24 is the graph plotted based on the recessed portion 10 and the pin head portion 31 having the dimensions shown in FIG. 22.

As shown in FIG. 21, if there is no dimensional difference between the depth of the recessed portion 10 of the dielectric 16 and the height of the pin head portion 31 of the conductive pin 17, then when the pin head portion 31 of the conductive pin 17 and the projection 40 come into contact with each other, the conductive pin 17 will be electrically connected to the conductive elastic member 19 through the projection 40. Then, if the pressure is increased and therefore the small projection 40 provided on the tip end portion 19a' of the conductive elastic member 19 is deformed, the small projection 40 will be substantially completely crushed, so that the tip end portion 19a' of the conductive elastic member 19 and the first surface 28 of the dielectric 16 will come into contact with each other. Consequently, capacitance will be generated due to the contact between the tip end portion 19a' and the first surface 28 of the dielectric 16. Thus, pressure can be detected merely based on the deformation of the small projection 40 provided on the tip end portion 19a' of the conductive elastic member 19. As a result, it becomes possible to detect a very small load (i.e., a very low pressure) lower than 5 g.

As shown in FIG. 22, if the dimension difference between the depth of the recessed portion 10 of the dielectric 16 and the height of the pin head portion 31 of the conductive pin 17 becomes the maximum, the projection 40 provided on the conductive elastic member 19 will be inserted into the recessed portion 10 of the dielectric 16. At this time, the tip end portion 19a' of the conductive elastic member 19 approaches closely to but does not touch the peripheral edge portion of the recessed portion 10. In other words, the tip end portion 19a' of the conductive elastic member 19 and the first surface 28 of the dielectric 16 can be brought into contact with each other if a subtle pressure is applied. Thus, the conductive elastic member 19 and the dielectric 16 can be brought into contact if a very small load is applied.

As a result, as shown in FIG. 24, even when the dimensional difference between the recessed portion 10 of the dielectric 16 and the pin head portion 31 of the conductive pin 17 becomes the maximum, it is possible to detect a very small load (i.e., a very low pressure) lower than 5 g. Thus, a very low pressure applied to the rod 3 can be precisely detected with the variable capacitor 5 of the present embodiment. Further, the pressure applied to the rod 3 can be precisely detected regardless of the level of the dimensional difference between the recessed portion 10 of the dielectric 16 and the pin head portion 31 of the conductive pin 17.

Figure 25:
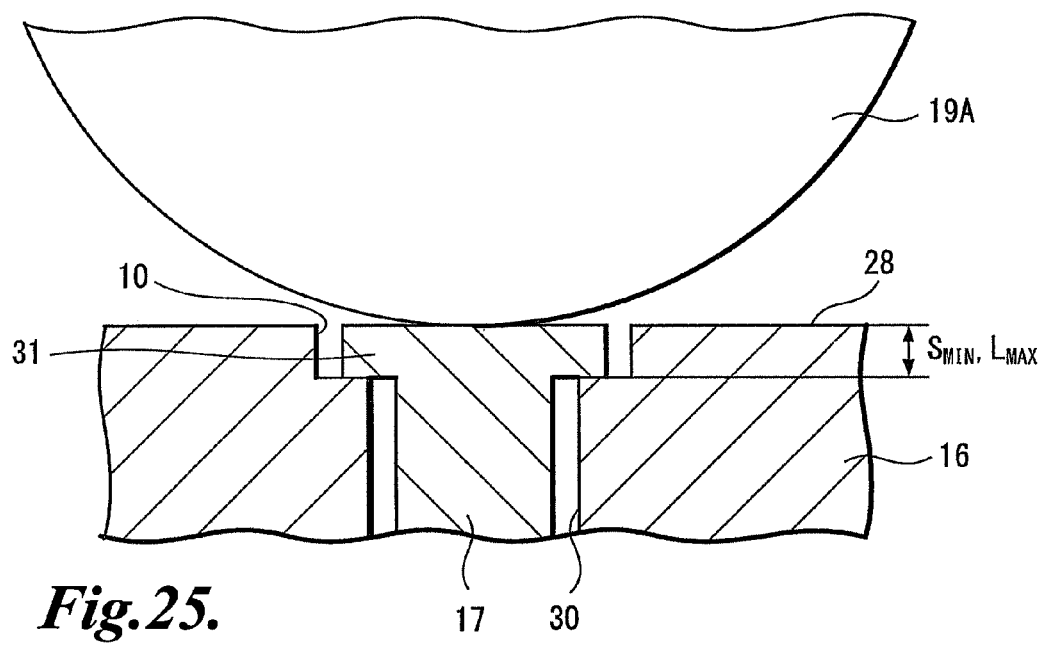
FIG. 25 is an enlarged cross section showing a primary portion of a variable capacitor according to a related art where the depth of the recessed portion of the dielectric is set to the minimum value, and the thickness of the pin head portion of the conductive pin is set to the maximum value.
Figure 26:
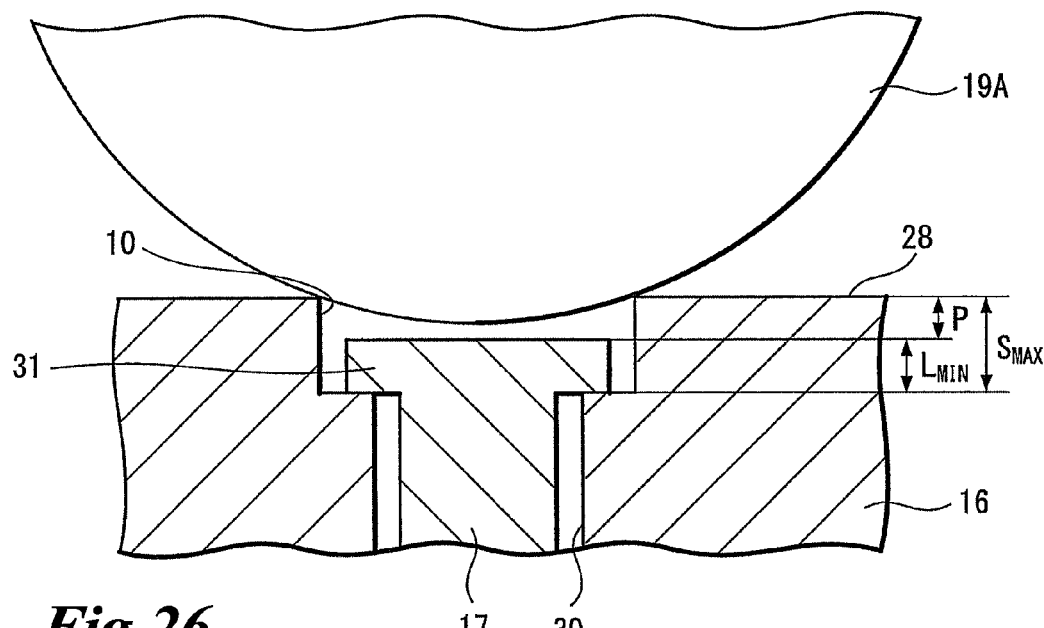
FIG. 26 is an enlarged cross section showing a primary portion of the variable capacitor according to the related art where the depth of the recessed portion of the dielectric is set to the maximum value, and the thickness of the pin head portion of the conductive pin is set to the minimum value.
Figure 27:
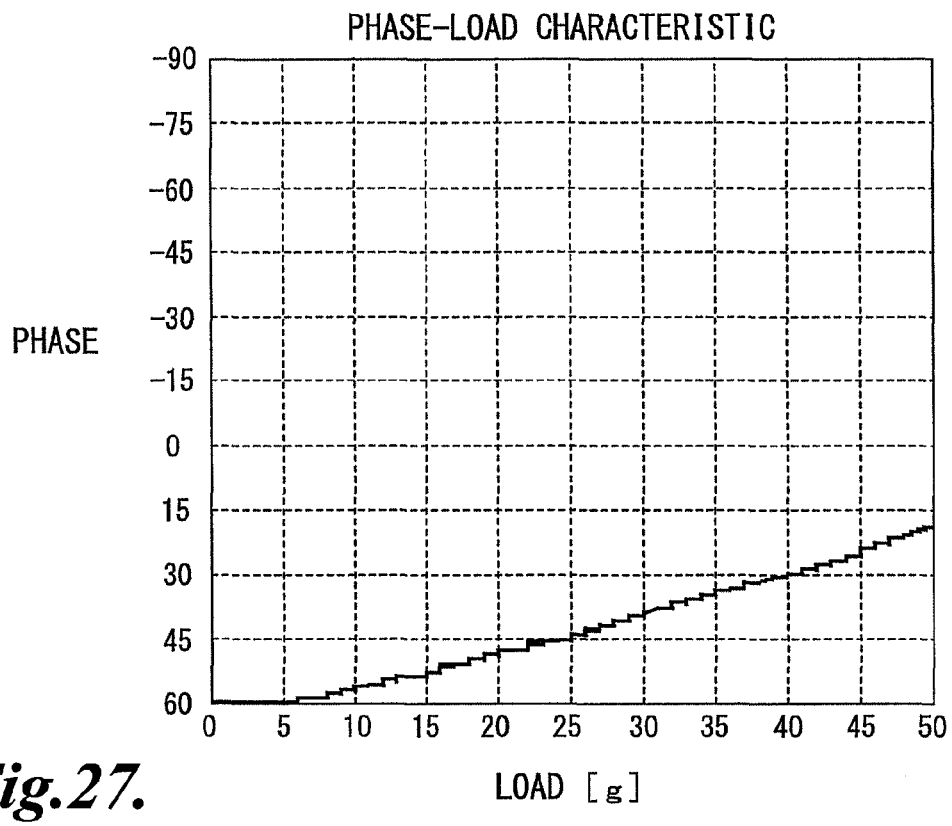
FIG. 27 is a graph showing the phase-load characteristic of the variable capacitor shown in FIG. 25.
Figure 28:
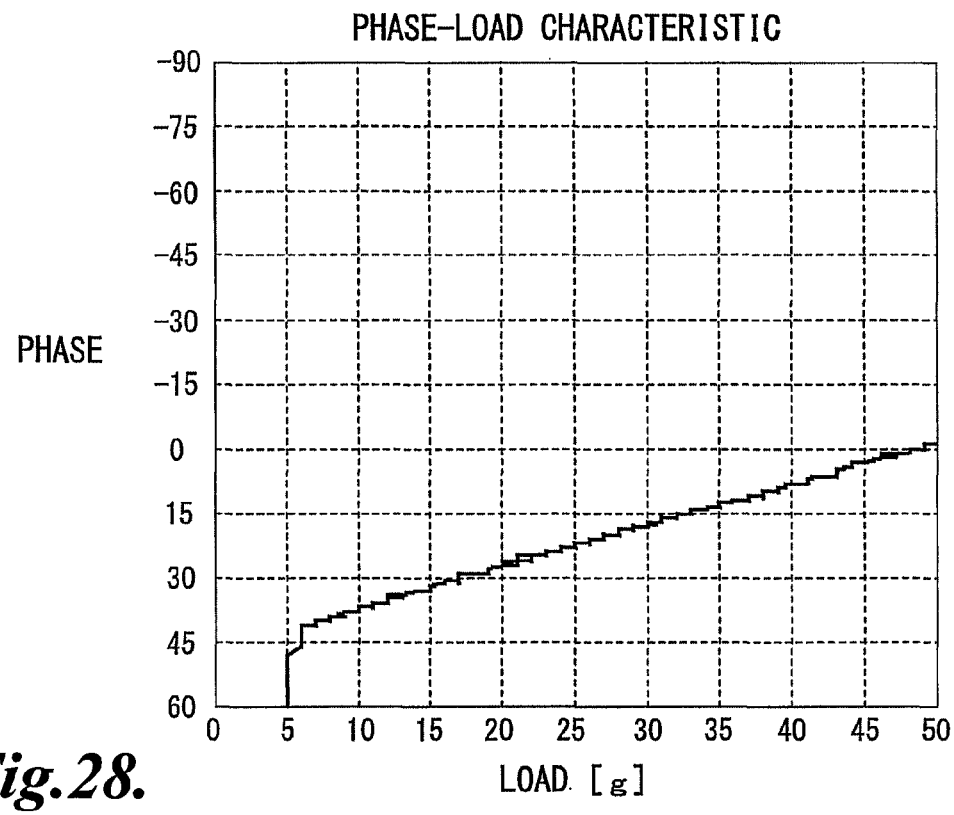
FIG. 28 is a graph showing the phase-load characteristic of the variable capacitor shown in FIG. 26.

The detection accuracy of the pressure of a variable capacitor with no tip end plane portion and no projection provided in the tip end plane portion of the conductive elastic member 19 will be described below with reference to FIGS. 25 to 28. In FIG. 25, the depth of the recessed portion 10 of the dielectric 16 and the thickness of the pin head portion 31 of the conductive pin 17 are identical to those of FIG. 21. In FIG. 26, the depth of the recessed portion 10 of the dielectric 16 and the thickness of the pin head portion 31 of the conductive pin 17 are identical to those of FIG. 22. FIG. 27 is a graph showing a relation between the load applied to the rod 3 of the variable capacitor 5 shown in FIG. 25 and the phase. FIG. 28 is a graph showing a relation between the load applied to the rod 3 of the variable capacitor 5 shown in FIG. 26 and the phase.

As shown in FIG. 25, the tip end of the conductive elastic member 19A contacts the pin head portion 31 of the conductive pin 17 but does not contact the dielectric 16. Thus, in order for the conductive elastic member 19A to contact the dielectric 16, the whole tip end portion of the conductive elastic member 19A needs to be flattened. However, if the load (i.e., the pressure) is very small, the whole tip end portion of the conductive elastic member 19A can not be deformed. As a result, as shown in the graph of FIG. 27, pressure can not be detected unless a load equal to or higher than a predetermined value (5 g in this example) is applied.

As shown in FIG. 26, although the conductive elastic member 19A contacts the peripheral edge portion of the recessed portion 10 of the dielectric 16, the tip end of the conductive elastic member 19 does not contact the pin head portion 31 of the conductive pin 17. Thus, in order for the conductive elastic member 19A to contact the pin head portion 31 of the conductive pin 17 and for the conductive elastic member 19A to contact the first surface 28 of the dielectric 16, a load (i.e., a pressure) equal to or higher than a predetermined value has to be applied. As a result, as shown in the graph of FIG. 28, pressure applied to the rod 3 can not be detected unless a load equal to or higher than 5 g is applied. Thus, it is impossible to detect a very small pressure (pen pressure) lower than 5 g with the variable capacitor having the conductive elastic member 19A of the shape shown in FIGS. 26 and 27.

Figure 29:
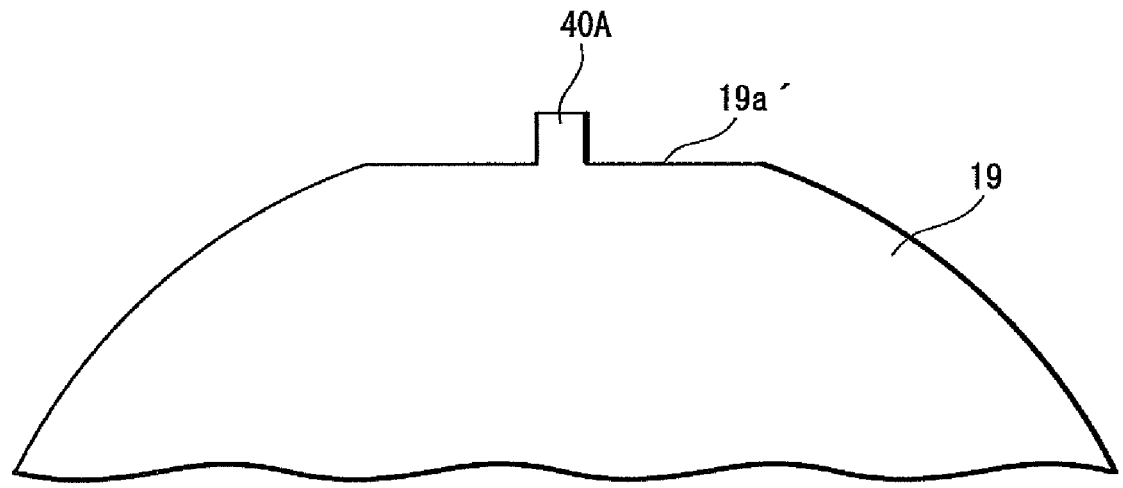
FIG. 29 is a view showing another embodiment of the conductive elastic member of the variable capacitor according to the present invention.
Figure 30:
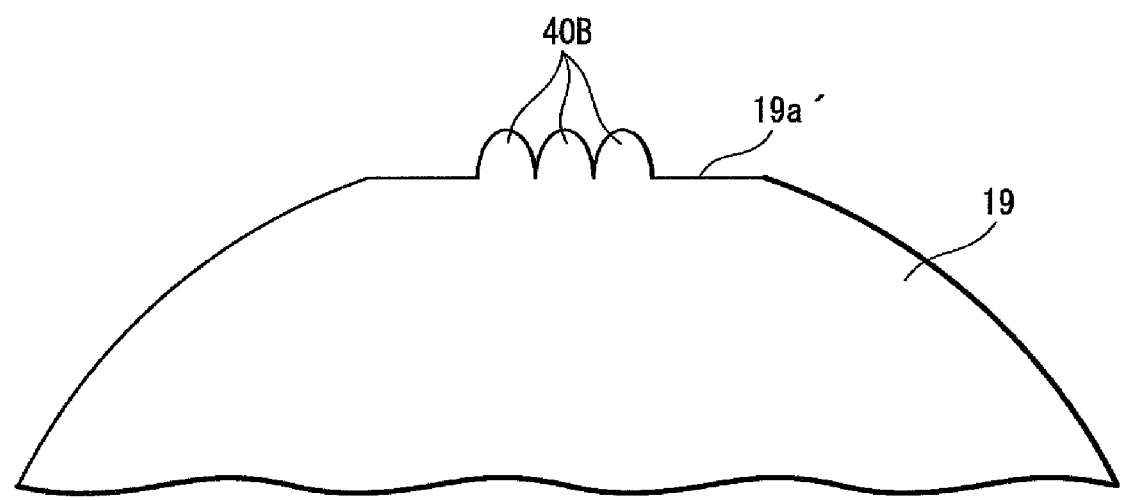
FIG. 30 is a view showing yet another embodiment of the conductive elastic member of the variable capacitor according to the present invention.

Also, although the present embodiment is described using an example in which the projection 40 of the conductive elastic member 19 is formed in a substantially semispherical shape, the present invention is not limited to that example. For example, as shown in FIG. 29, the tip end portion 19a' may be provided with a projection 40A formed in a cylindrical shape or polygonal prism shape. Further, as shown in FIG. 30, the tip end portion 19a' may be provided with a plurality of projections 40B.

Figure 31:
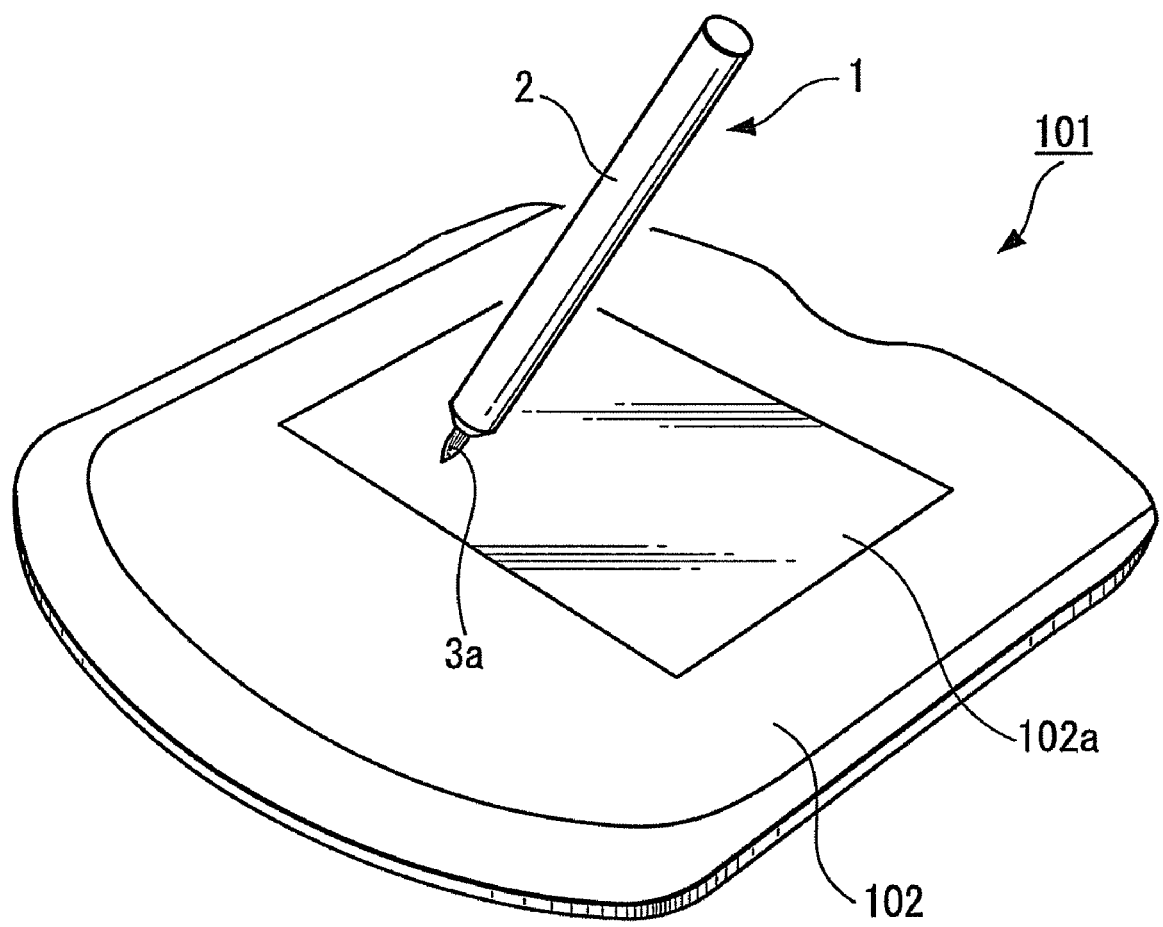
FIG. 31 is a perspective view showing an embodiment of a coordinate input device according to the present invention.
Figure 32:
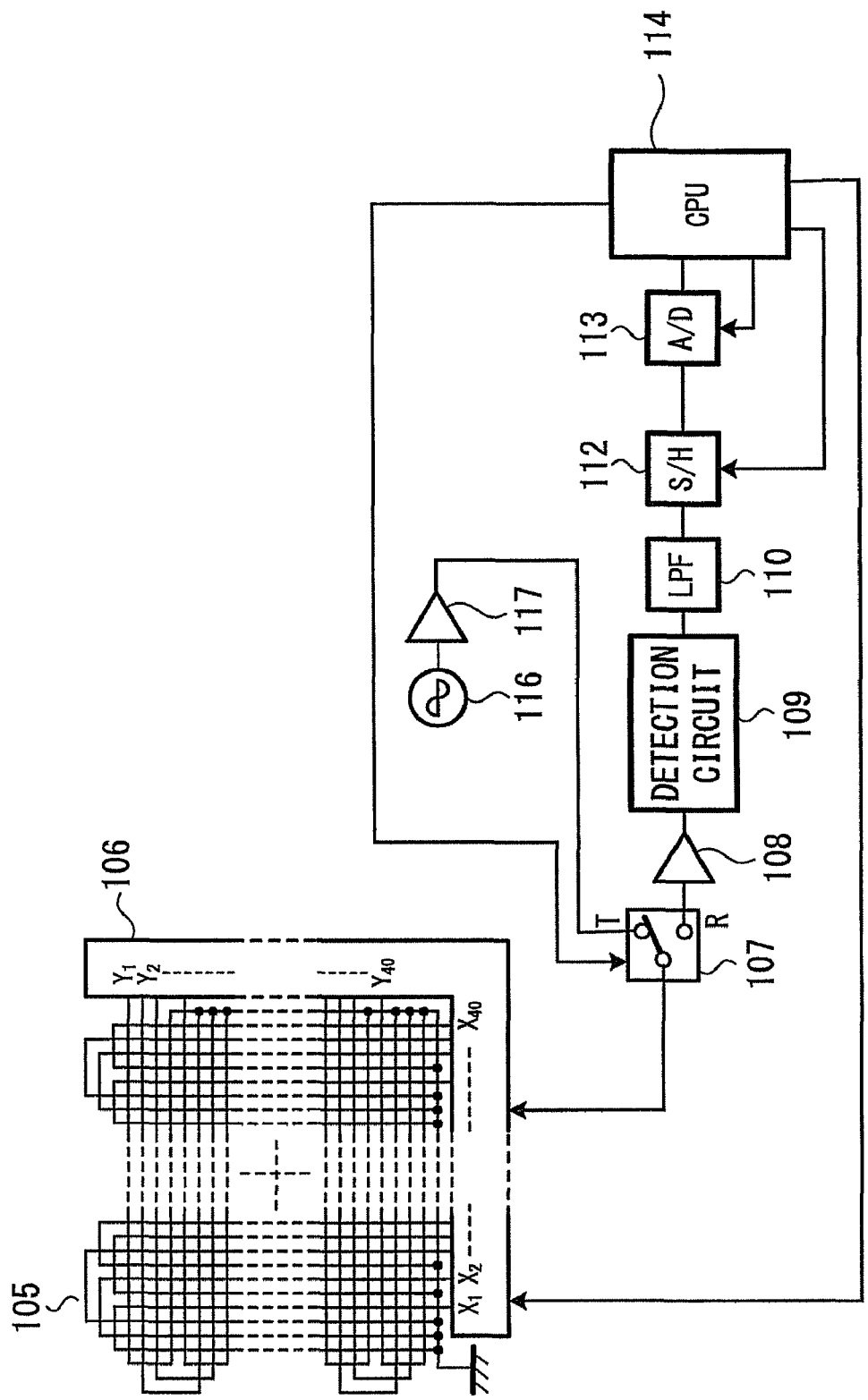
FIG. 32 is a block diagram briefly showing a circuit configuration of a position detecting device of the coordinate input device.

FIG. 31 shows an embodiment of a coordinate input device equipped with the position indicator 1 having the aforesaid configuration and advantages. FIG. 32 is a block diagram showing the configuration of the position detection device of the coordinate input device shown in FIG. 31.

As shown in FIG. 31, a coordinate input device 101 according to an embodiment of the present invention includes a position detecting device 102 having an input surface 102a, and the position indicator 1 for indicating its own position relative to the input surface 102a of the position detecting device 102. By connecting the position detecting device 102 to an external unit (not shown) such as a personal computer or a PDA (Personal Digital Assistant), the coordinate input device 101 serves as an input device of such an external unit.

The configuration of the position detecting device 102 of the coordinate input device 101 and the position detecting method using the position detecting device 102 will be described below with reference to FIGS. 31 and 32.

The position detecting device 102 of the coordinate input device 101 is a substantially rectangular flat shaped device. One flat surface of the position detecting device 102 has an input surface 102a arranged thereon, and the other flat surface of the position detecting device 102 opposite the input surface 102a serves as a mounting surface. Inside the position detecting device 102, a position detecting section 105, which works based on an electromagnetic resonance technology, is provided in a position corresponding to the input surface 102a.

The position detecting section 105 has loop coils $X_1$ to $X_{40}$ and loop coils $Y_1$ to $Y_{40}$. The loop coils $X_1$ to $X_{40}$ include forty loop coils arranged in an X-axis direction. The loop coils $Y_1$ to $Y_{40}$ include forty loop coils arranged in a Y-axis direction. Each of the loop coils $X_1$ to $X_{40}$ and loop coils $Y_1$ to $Y_{40}$ is connected to a selecting circuit 106 for selecting the loop coils $X_1$ to $X_{40}$ and loop coils $Y_1$ to $Y_{40}$.

The selecting circuit 106 is connected to a transmission/reception switching circuit 107. An amplifier 108 is connected to a reception side terminal R of the transmission/reception switching circuit 107. The amplifier 108 is connected to a detection circuit 109. The detection circuit 109 is connected to a sample-and-hold circuit 112 through a low-pass filter (LPF) 110. The sample-and-hold circuit 112 is connected to an A/D conversion circuit (analog-digital conversion circuit) 113. The A/D conversion circuit 113 is connected to a CPU (central processing unit) 114. The CPU 114 supplies control signals respectively to the selecting circuit 106, the sample-and-hold circuit 112, the A/D conversion circuit 113 and the transmission/reception switching circuit 107.

Further, the position detecting device 102 is provided with an oscillator 116 for generating an AC signal having a frequency $f_0$ and a current driver 117 for converting the AC signal to a current. The current driver 117 is connected to a transmission side terminal T of the transmission/reception switching circuit 107. When the contact point of the transmission/reception switching circuit 107 is switched from the reception side terminal R to the transmission side terminal T in response to the control signal supplied from the CPU 114, a magnetic field is generated by the loop coils $X_1$ to $X_{40}$ and loop coils $Y_1$ to $Y_{40}$ of the position detecting section 105.

If the position indicator 1 approaches the position detecting section 105, a resonant circuit built into the position indicator 1 will resonate so as to generate an induced voltage. The contact point of the transmission/reception switching circuit 107 is switched from the transmission side terminal T to the reception side terminal R in response to the control signal supplied from the CPU 114. Thus, the supply of the magnetic field to the position indicator 1 is stopped. As a result, the induced voltage generated by the resonant coil 4 of the position indicator 1 generates a magnetic field during reception time. The position detecting section 105 detects the position of the position indicator 1 by detecting the magnetic field generated by the resonant coil 4.

Further, the position indicator 1 detects the X-Y coordinates of the position based on the selected loop coils from the loop coils $X_1$ to $X_{40}$ and loop coils $Y_1$ to $Y_{40}$.

Figure 33:
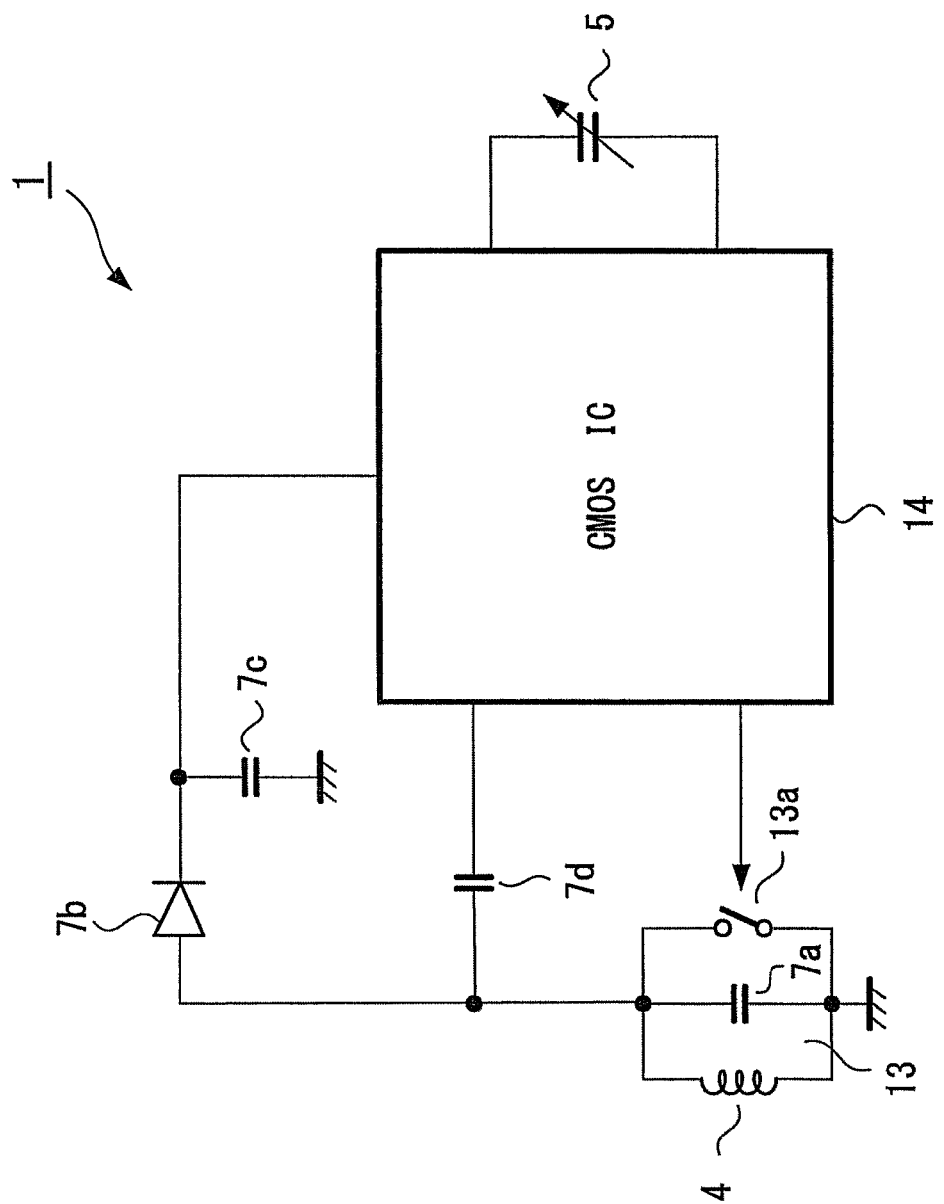
FIG. 33 is a circuit diagram of the position indicator according to the present invention.
Figures 34A, 34B:
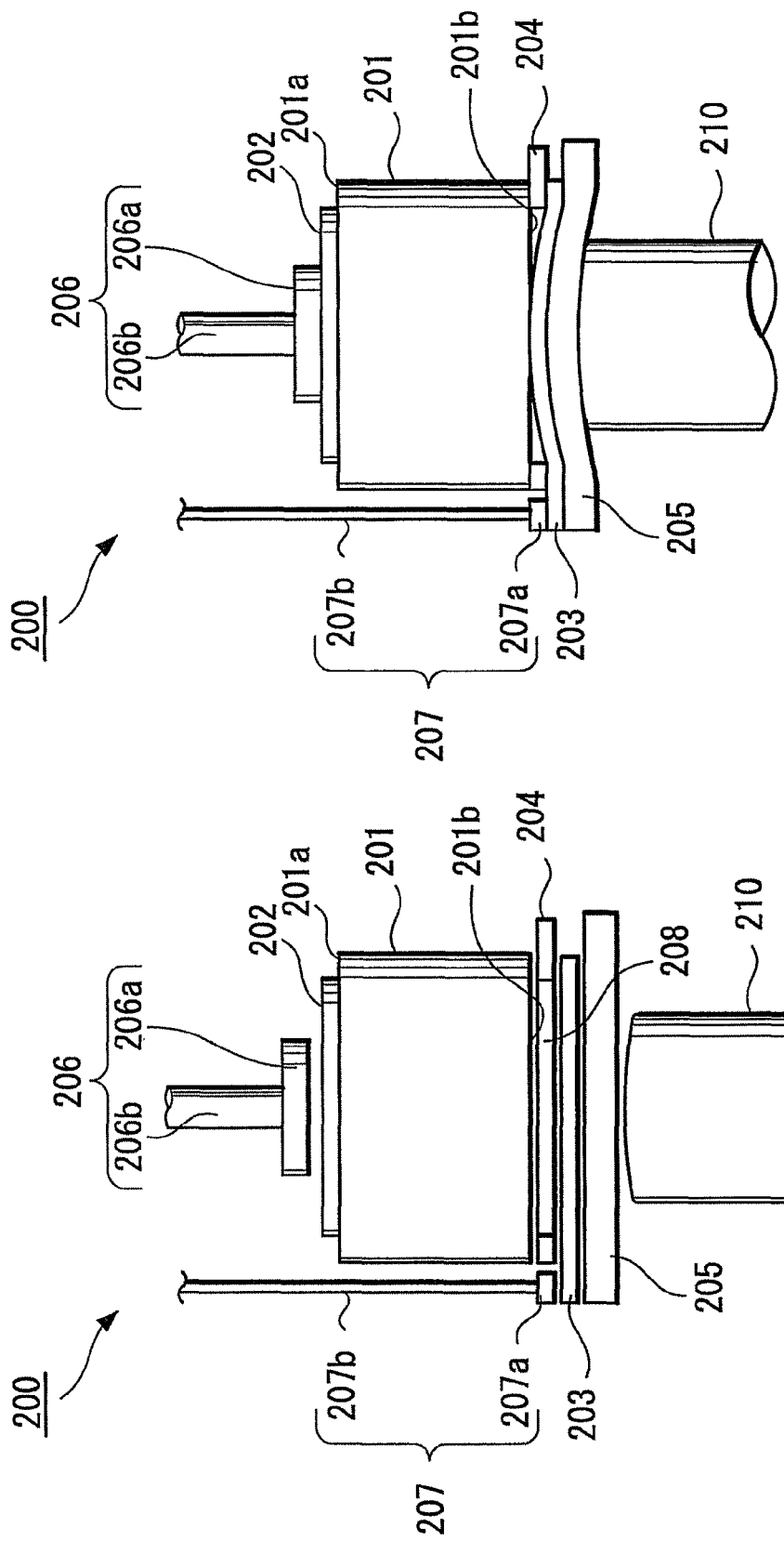

The schematic circuit diagram of the position indicator 1 shown in FIG. 31 will be described below with reference to FIG. 33. As shown in the circuit diagram of the position indicator 1, for example, the resonant coil 4 and a resonant capacitor 7a form a resonant circuit 13 which resonates at a frequency $f_0$ output from the position detecting section 105 provided in the coordinate input device 101. Further, an integrated circuit 14 based on a well-known CMOS technology is mounted on the printed circuit board 7 shown in FIG. 1. The integrated circuit 14 is driven by a driving power generated by a diode 7 and a capacitor 7.

The diode 7b is connected to the resonant circuit 13. Further, an AC voltage generated in the resonant circuit 13 based on an excitation signal supplied from the resonant coil 4 is applied to the diode 7b. The AC voltage is rectified by the diode 7b and the capacitor 7c and converted into a DC voltage so as to serve as the driving power for driving the integrated circuit 14. Further, the signal generated by the resonant circuit 13 is supplied to the integrated circuit 14 through a capacitor 7d. Based on the signal supplied through the capacitor 7d, the integrated circuit 14 generates a clock signal for sending/receiving signals between the position indicator 1 and the coordinate input device 101 and a clock signal for detecting the pen pressure.

Further, as described above, the capacitance of the variable capacitor 5 varies in response to the pen pressure. The variable capacitor 5 is connected to a resistor (not shown) to form a time-constant circuit, and the time constant of the time-constant circuit varies in response to the variation of the capacitance of the variable capacitor 5 which varies in response to the pen pressure. Further, the number of waves of the signal generated by the resonant circuit 13 is counted by the integrated circuit 14 in accordance with the time period corresponding to the time constant. The counted value is converted to the pen pressure value of a predetermined number of bits (for example, 8 bits).

The pen pressure data obtained in such a manner is output from the integrated circuit 14 bit by bit in synchronization with the clock signal, which is provided for sending/receiving signals between the position indicator 1 and the coordinate input device 101, to control a switch 13a connected in parallel to the resonant circuit 13. Thus, when the switch 13a is open, the signal output from the position indicator 1 can be detected by the coordinate input device 101; while when the switch 13a is closed, since the resonant circuit 14 is short-circuited, the signal output from the position indicator 1 can not be detected.

Thus, in the coordinate input device 101, the pen pressure can be detected by detecting the signal transmitted from the position indicator 1 after the excitation signal from the resonant coil 4 has been transmitted for a predetermined time.

In the variable capacitor according to the present invention, as described above, a biasing member for biasing the dielectric or the electrode portion of the lead electrode is provided. With such an arrangement, the electrode portion and the dielectric can be reliably brought into contact with each other, and therefore poor contact between the dielectric and the lead electrode can be prevented. Further, in the variable capacitor according to the present invention, since the ring-shaped spacer and the flexible second electrode necessary for the variable capacitor according to the related art is eliminated, the configuration of the variable capacitor can be simplified.

Further, the sleeve, which serves as the chassis of the variable capacitor, and the lead electrode can be integrally formed in one process by using the hoop molding method. Thus, it becomes possible to press-form the lead electrode and injection-mold the sleeve 15 at the same time. As a result, the process of attaching the lead electrode to the inside of the sleeve is eliminated, therefore the number of assembling steps can be reduced, and the assembly work efficiency can be improved.

It is to be understood that the present invention is not limited to the embodiments described above and illustrated in the attached drawings, and various modifications can be made without departing from the spirit and scope of the present invention.

What is claimed is:

1. A coordinate input device comprising:
a position detecting device having an input surface; and
a position indicator for indicating its own position relative to the input surface, wherein the position indicator comprises:
a housing;
a rod housed in the housing and having a pen-tip projected to the outside of the housing; and
a variable capacitor for detecting a pressing force applied to the pen-tip,
wherein the variable capacitor comprises:
a chassis having an opening opened on one face thereof and a main face portion located opposite the opening, the main face portion having a through-hole formed therein;
a dielectric housed in the chassis and having a hole extending from a first surface to a second surface thereof, the second surface being opposite the first surface;
a first terminal inserted into the hole formed in the dielectric and the through-hole formed in the main face portion, one end of the first terminal being exposed to the outside of the chassis from the main face portion and the other end of the first terminal having a pin head portion abutting the first surface of the dielectric;
a second terminal having a first electrode portion interposed between the second surface of the dielectric and the main face portion of the chassis, and a terminal portion exposed to the outside of the chassis from the main face portion, the first electrode portion forming one electrode of the variable capacitor;
a conductive elastic member disposed so as to be able to contact the first surface of the dielectric, the conductive elastic member serving as a second electrode by being pressed toward the first surface of the dielectric by the pressing force applied to the pen-tip, the second electrode forming the other electrode of the variable capacitor; and
a biasing member for bringing the second surface of the dielectric into contact with the first electrode portion.

2. The coordinate input device according to claim 1, wherein the conductive elastic member is provided with a projection at a position opposing the pin head portion of the first terminal.

3. The coordinate input device according to claim 1, wherein the biasing member has elasticity, and the dielectric and the first electrode portion are biased by the elastic force of the biasing member.

4. The coordinate input device according to claim 1, wherein the biasing member has elasticity, and is interposed between the main face portion of the chassis and the dielectric to bias the first electrode portion and the dielectric.

5. A position indicator comprising:
a housing;
a rod housed in the housing and having a pen-tip projected to the outside of the housing; and
a variable capacitor for detecting a pressing force applied to the pen-tip,
wherein the variable capacitor comprises:
a chassis having an opening opened on one face thereof and a main face portion located opposite the opening, the main face portion having a through-hole formed therein;
a dielectric housed in the chassis and having a hole extending from a first surface to a second surface thereof, the second surface being opposite the first surface;

a first terminal inserted into the hole formed in the dielectric and the through-hole formed in the main face portion, one end of the first terminal being exposed to the outside of the chassis from the main face portion and the other end of the first terminal having a pin head portion abutting the first surface of the dielectric;

a second terminal having a first electrode portion interposed between the second surface of the dielectric and the main face portion of the chassis, and a terminal portion exposed to the outside of the chassis from the main face portion;

a conductive elastic member disposed so as to be able to contact the first surface of the dielectric, the conductive elastic member serving as a second electrode by being pressed toward the first surface of the dielectric by the pressing force applied to the pen-tip; and a biasing member for bringing the second surface of the dielectric into contact with the first electrode portion.

6. The position indicator according to claim 5, wherein the conductive elastic member is provided with a projection at a position opposing the pin head portion of the first terminal.

7. The position indicator according to claim 5, wherein the biasing member has elasticity, and the dielectric and the first electrode portion are biased by the elastic force of the biasing member.

8. The position indicator according to claim 5, wherein the biasing member has elasticity, and is interposed between the main face portion of the chassis and the dielectric to bias the first electrode portion and the dielectric.

9. A variable capacitor comprising
a chassis having an opening opened on one face thereof and a main face portion located opposite the opening, the main face portion having a through-hole formed therein;
a dielectric housed in the chassis and having a hole extending from a first surface to a second surface thereof, the second surface being opposite the first surface;
a first terminal inserted into the hole formed in the dielectric and the through-hole formed in the main face portion, one end of the first terminal being exposed to the outside of the chassis from the main face portion and the other end of the first terminal having a pin head portion abutting the first surface of the dielectric;
a second terminal having a first electrode portion interposed between the second surface of the dielectric and the main face portion of the chassis, and a terminal portion exposed to the outside of the chassis from the main face portion;
a conductive elastic member disposed so as to be able to contact the first surface of the dielectric, the conductive elastic member serving as a second electrode by being pressed toward the first surface of the dielectric by a pressing force applied from the external; and
a biasing member for bringing the second surface of the dielectric into contact with the first electrode portion.

10. The variable capacitor according to claim 9, wherein the conductive elastic member is provided with a projection at a position opposing the pin head portion of the first terminal.

11. The variable capacitor according to claim 9, wherein the biasing member has elasticity, and the dielectric and the first electrode portion are biased by the elastic force of the biasing member.

12. The variable capacitor according to claim 9, wherein the biasing member has elasticity, and is interposed between the main face portion of the chassis and the dielectric to bias the first electrode portion and the dielectric.

13. The variable capacitor according to claim 9, wherein the biasing member comprises one or more spring portions.

14. The variable capacitor according to claim 9, wherein the first electrode portion includes a plurality of projections provided on one surface thereof to be brought into point-contact with the second surface of the dielectric.

15. A position indicator comprising:
a housing;
a rod housed in the housing and having a pen-tip projected to the outside of the housing; and
a variable capacitor for detecting a pressing force applied to the pen-tip,
wherein the variable capacitor comprises:
a chassis having an opening opened on one face thereof and a main face portion located opposite the opening, the main face portion having a through-hole formed therein;
a dielectric housed in the chassis and having a hole extending from a first surface to a second surface thereof, the second surface being opposite the first surface;
a first terminal inserted into the hole formed in the dielectric and the through-hole formed in the main face portion, one end of the first terminal being exposed to the outside of the chassis from the main face portion and the other end of the first terminal having a pin head portion abutting the first surface of the dielectric;
a second terminal having a first electrode portion interposed between the second surface of the dielectric and the main face portion of the chassis, and a terminal portion exposed to the outside of the chassis from the main face portion;
a conductive elastic member disposed so as to be able to contact the first surface of the dielectric, the conductive elastic member serving as a second electrode by being pressed toward the first surface of the dielectric by the pressing force applied to the pen-tip; and
a contact holding member for holding the contact state between the second surface of the dielectric and the first electrode portion.

16. The position indicator according to claim 15, wherein the contact holding member has elasticity, and the dielectric and the first electrode portion are held in contact with each other by the elastic force of the contact holding member.

17. The position indicator according to claim 15, wherein the contact holding member has elasticity, and is interposed between the main face portion of the chassis and the dielectric to hold the first electrode portion and the dielectric in contact with each other.

18. The position indicator according to claim 15, wherein the first electrode portion includes a plurality of projections provided on one surface thereof to be brought into point-contact with the second surface of the dielectric.

* * * * *